United States Patent [19]

Harara et al.

[11] Patent Number: 5,481,458
[45] Date of Patent: Jan. 2, 1996

[54] CASTER ANGLE CONTROL APPARATUS AND METHOD FOR SUSPENSION

[75] Inventors: Mitsuhiko Harara; Yoshiki Miichi, both of Okazaki; Tsuyoshi Takeo, Nagoya; Tadao Tanaka, Okazaki, all of Japan

[73] Assignee: Mitsubishi Jidosha Kogyo Kabushiki Kaisha, Tokyo, Japan

[21] Appl. No.: 260,976

[22] Filed: Jun. 15, 1994

[30] Foreign Application Priority Data

Jun. 16, 1993 [JP] Japan .................... 5-144659

[51] Int. Cl.⁶ ............................ G01B 5/24; B60G 17/015
[52] U.S. Cl. ................. 364/424.05; 364/559; 280/661; 180/140
[58] Field of Search ................. 364/424.05, 426.04, 364/551.01, 559, 565; 356/155; 180/140, 141, 142, 143; 280/688, 707, 772, 91, 660, 661, 668, 675, 691; 33/203.12, 203.18, 288

[56] References Cited

U.S. PATENT DOCUMENTS

| | | | |
|---|---|---|---|
| 4,353,568 | 10/1982 | Boyce | 280/94 |
| 4,823,470 | 4/1989 | Hörvallius | 33/228 |
| 4,835,714 | 5/1989 | Sano et al. | 364/551.01 |
| 4,836,577 | 6/1989 | Abe et al. | 280/773 |
| 4,878,688 | 11/1989 | Kubo | 280/693 |
| 5,257,458 | 11/1993 | Koerner | 33/203.12 |
| 5,291,660 | 3/1994 | Koerner | 33/203.18 |

FOREIGN PATENT DOCUMENTS

| | | |
|---|---|---|
| 59-67111 | 4/1984 | Japan . |
| 487884 | 3/1992 | Japan . |
| 5131951 | 5/1993 | Japan . |
| 2271968 | 5/1994 | United Kingdom . |

*Primary Examiner*—Kevin J. Teska
*Assistant Examiner*—Tan Q. Nguyen

[57] ABSTRACT

Operation amounts of actuators are controlled in response to a steering wheel angle θh, a steering wheel angular velocity θhs, and a road surface μ, in addition to a vehicle speed Vel, to change a caster angle. The caster angle is increased to increase a righting moment of vehicle wheels during steering. The caster angle is increased according to the vehicle speed Vel in non-steering and initial steering conditions, to stabilize the vehicle. This thereby improves the vehicle stability in normal and transitional conditions.

20 Claims, 17 Drawing Sheets

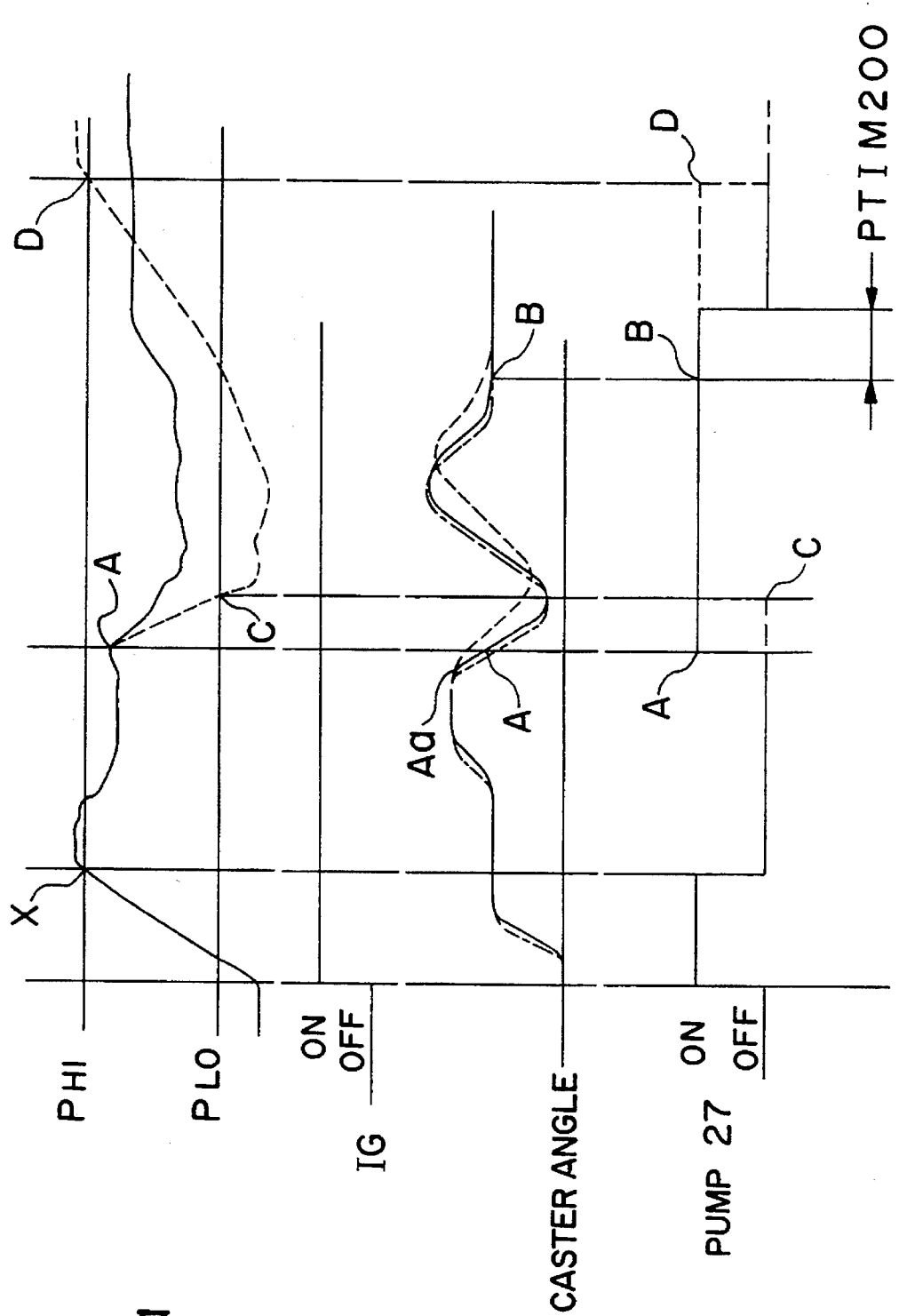

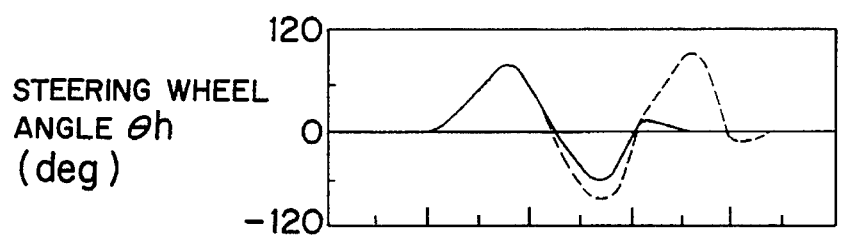
FIG. 19a  STEERING WHEEL ANGLE $\theta h$ (deg)
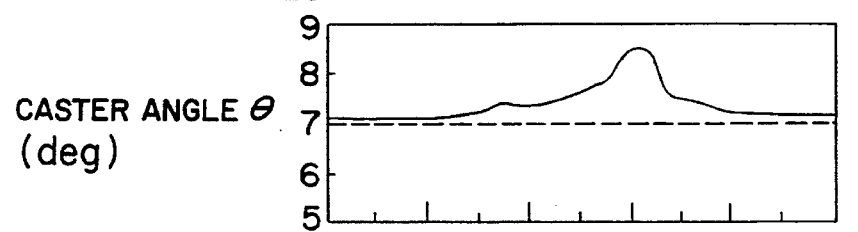
FIG. 19b  CASTER ANGLE $\theta$ (deg)
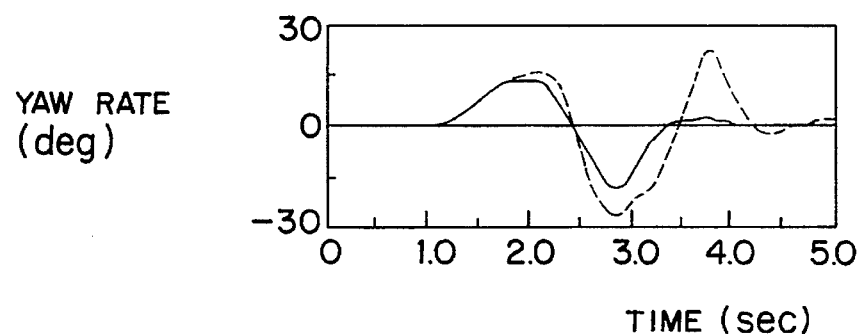
FIG. 19c  YAW RATE (deg)
TIME (sec)

CASTER ANGLE CONTROL APPARATUS AND METHOD FOR SUSPENSION

BACKGROUND OF THE INVENTION

This invention relates to a caster angle control apparatus and method for a suspension of a vehicle.

Heretofore, a suspension apparatus for a vehicle was known which comprised an actuator for varying an arm length and the mounting position on the vehicle body of a specific suspension arm, and a controller for controlling the actuator. When the controller drove the actuator, relative positions of the arms and struts of the suspension apparatus were varied, which varied the alignment of the suspension apparatus, that is, a caster angle and a trail of the suspension apparatus, a toe-in angle and a camber angle of the vehicle wheels, and the like. The controller actively operated the alignment according to the traveling condition of the vehicle to improve the straightforward running stability, turning stability, and the like of the vehicle.

The caster angle is very important in view of the steering characteristics and running stability. However, when the caster angle is increased, when the vehicle wheels deviate from the straightforward running position during traveling, a righting moment to return the wheels to the straightforward running position is increased to improve the running stability during high-speed traveling. However, operation of the steering wheel becomes heavy during low-speed traveling, resulting in deteriorated steering characteristics. On the contrary, when the caster angle is decreased, operation of the steering wheel during low-speed traveling becomes light, but the running stability at a high speed will be degraded.

Then, for example, Japanese Patent Laid-open Publication (OPI) 59-67111 proposed an alignment control method, in which the caster angle was variable in response to the vehicle speed, that is, the caster angle was increased during high-speed traveling, and decreased during medium- or low-speed traveling. By varying the caster angle according to the vehicle speed, ease of steering during medium- or low-speed traveling, and a steering response during high-speed traveling were obtained, thereby improving the steering characteristics and the high-speed running stability.

However, although such an alignment control method provided ease of steering during medium- and low-speed traveling and a steering response during high-speed traveling, stability (convergence) of the vehicle tended to be deteriorated during operation of the steering wheel, particularly during rapid steering, in a transitional condition, or when the frictional condition of the road surface changed.

Then, Japanese OPI 4-87884 proposed an alignment control method controlled the caster angle in consideration of a steering angle or a steering angular velocity and the road surface condition. However, since, in such an alignment control method, the caster angle was increased according to an increase in the steering angle or the steering angular velocity in all conditions, stability of the vehicle could have possibly been impaired. Further, in the above alignment control method, the road surface condition meant an external disturbance factor, and it was not always a control according to a change in the frictional condition of the road surface. On the other hand, Japanese OPI 5-131951 proposed an alignment control method which increased the caster angle as the frictional coefficient of the road surface decreased. However, such an alignment control method intends to notify the driver of a normal steering angle limit due to a decrease in the frictional coefficient of the road surface, but was quite different from one which stabilized the vehicle against changes in frictional condition of the road surface, and thus did not always improve the stability (convergence) of the vehicle.

OBJECT AND SUMMARY OF THE INVENTION

A primary object of the present invention is to provide a caster angle control apparatus and method for a suspension of a vehicle which is able to improve both normal and transitional stabilities of the vehicle.

In accordance with the present invention, there is provided a caster angle control apparatus for a suspension of a vehicle comprising an actuator mounted to the suspension for varying a caster angle of vehicle wheels, operation energy supply means for supplying an operation energy of the actuator, actuator drive means disposed between the actuator and the operation energy supply means for setting a supply amount of the operation energy, vehicle speed detection means for detecting a vehicle speed, control means for setting a target caster angle to increase the caster angle according to an increase in the vehicle speed detected by the vehicle speed detection means and outputting a signal to control the operation of the actuator to the actuator drive means, steering angular velocity detection means for detecting a steering angular velocity, and road surface frictional coefficient detection means for detecting a frictional coefficient of the road surface, wherein the control means generates a steering angular velocity correction amount from an additional coefficient predetermined from the vehicle speed and the road surface frictional coefficient detected by the road surface frictional coefficient detection means and the steering angular velocity detected by the steering angular velocity detection means, and corrects the target caster angle according to the steering angular velocity correction amount.

Preferably, the steering angular velocity correction amount is set by multiplying a steering angular velocity coefficient set according to the vehicle speed and the road surface frictional coefficient by the steering angular velocity. In this case, it is more preferable that the steering angular velocity coefficient is set to increase as the vehicle speed increases in a region of less than a first preset vehicle speed, and set to decrease as the vehicle speed increases in a region of greater than the first preset vehicle speed. Further, the steering angular velocity coefficient is set to zero in a region where an absolute value of the steering angular velocity is less than a lower threshold value, and the steering angular velocity coefficient is set to an upper threshold value in a region where the value of the steering angular velocity is greater than the upper threshold value. More preferably, the steering angular velocity coefficient is set to a fixed value in a region between the first preset vehicle speed and a second preset vehicle speed, which is greater than the first preset vehicle speed; set to zero in a region of less than a third preset vehicle speed, which is smaller than the first preset vehicle speed; set to zero in a region of greater than a fourth preset vehicle speed, which is greater than the second preset vehicle speed; and is increased as the road surface frictional coefficient decreases.

Preferably, the target caster angle is set according to a predetermined first increasing rate in a speed region of smaller than a preset vehicle speed; and is set according to a predetermined second increasing rate, which is smaller than the first increasing rate, in a speed region of greater than the preset vehicle speed. In this case, more preferably, the target caster angle is set to a predetermined smallest value in a speed region of less than a lower threshold value; and is set to a predetermined greatest value in a speed region of greater than an upper threshold value.

Further, the caster angle control apparatus for a suspension preferably comprises steering angle detection means for detecting a steering angle, wherein the control means determines the turning direction according to the sign of the steering angle detected by the steering angle detection means, and corrects the target caster angle of the outer side wheel of turning to be relatively greater than the target caster angle of inner side wheel of turning.

Another caster angle control apparatus for a vehicle suspension of the present invention comprises an actuator mounted to the suspension for varying a caster angle of vehicle wheels, operation energy supply means for supplying an operation energy of the actuator, actuator drive means disposed between the actuator and the operation energy supply means for setting a supply amount of the operation energy, vehicle speed detection means for detecting a vehicle speed, control means having a plurality of control modes having predetermined different control gains, for setting a control gain by automatically or manually selecting the control mode, setting a target caster angle so as to increase the caster angle according to an increase in the vehicle speed detected by the vehicle speed detection means, and outputting a signal to control the operation of the actuator according to the above-set control gain to the actuator drive means, wherein the control means gradually varies the control gain when the control gain is changed.

The present invention has an advantage that since the operation amount of the actuator is controlled according to the steering wheel angle, the steering wheel angular velocity, and the road surface frictional coefficient, in addition to the vehicle speed, the caster angle can be increased during steering to increase the righting moment of the vehicle wheels. As a result, the stability of the vehicle is improved due to an increase in the caster angle by the vehicle speed during non-steering and initial steering. Thus, the vehicle stability is improved due to an increase in the caster angle according to the steering condition during steering, thereby improving the vehicle stability in normal and transitional conditions.

In operation, in a vehicle speed region where the vehicle speed is smaller than a preset value, the target caster angle has a negative value relative to the normal caster angle according to the vehicle speed, and ease of steering is improved at a relatively low vehicle speed. Further, in a vehicle speed region where the vehicle speed is greater than the preset value, the target caster angle has a positive value relative to the normal caster angle according to the vehicle speed, and the steering reaction, straightforward running stability, and the righting are improved at a relatively high vehicle speed.

Further, in a very high vehicle speed region where the vehicle speed is higher than the upper threshold value, the target caster angle is set to a predetermined maximum value and, for example, a vibration amplitude of the vehicle body in high speed running can be limited to a small value, thereby preventing the passengers from an unpleasant feeling.

Then, since the correction value according to the steering angular velocity is set to a particularly large value only in a vehicle speed region of relatively high stability which the vehicle inherently has, and its magnitude is increased as the road surface frictional coefficient decreases, the same steering feeling as running on a road of high surface frictional coefficient is obtained, and a good vehicle body behavior is achieved against transitional behaviors, for example, rapid turning or the like. Further, since the correction amount according to the steering angular velocity is zero when the steering angular velocity is small, unstable caster control will never occur during normal running.

Further, since, when the control mode is changed over, the control gain is gradually varied, an abrupt operation of the actuator can be prevented to eliminate a change-over shock.

Further, since the operation amount of the outer wheel side of turning is increased when the vehicle turns to increase the caster angle, the righting force of the outer wheels of turning which are applied with a high lateral force during turning is increased, thereby even further enhancing the vehicle stability.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 18 is a timing chart in pump control;

FIGS. 19(a), 19(b) and 19(c) are timing charts when changing lanes.

DETAILED DESCRIPTION OF PREFERRED EMBODIMENTS

Figure 1:
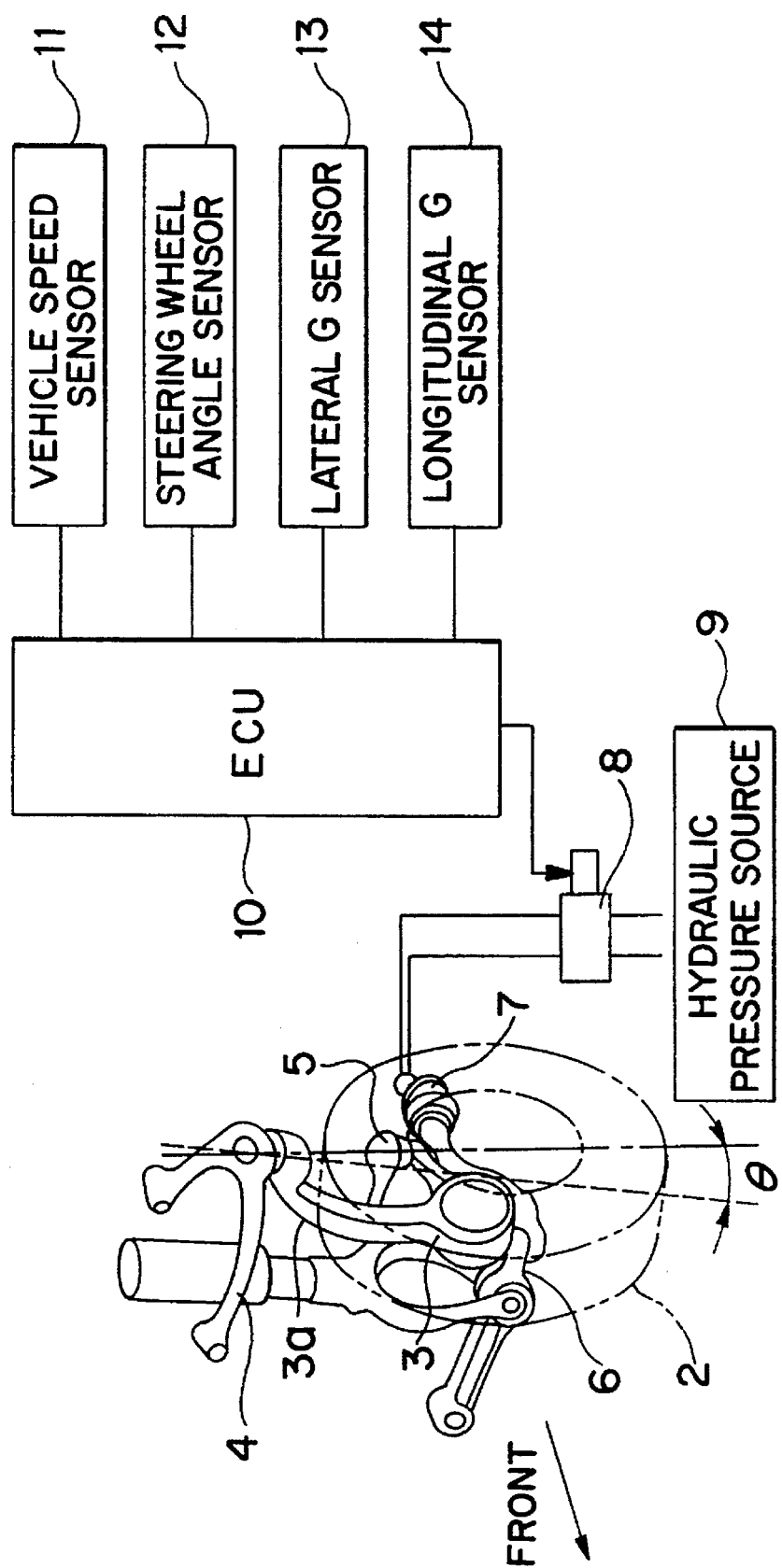
FIG. 1 is a schematic view showing the structure of an embodiment of the caster angle control apparatus according to the present invention.
Figure 2:
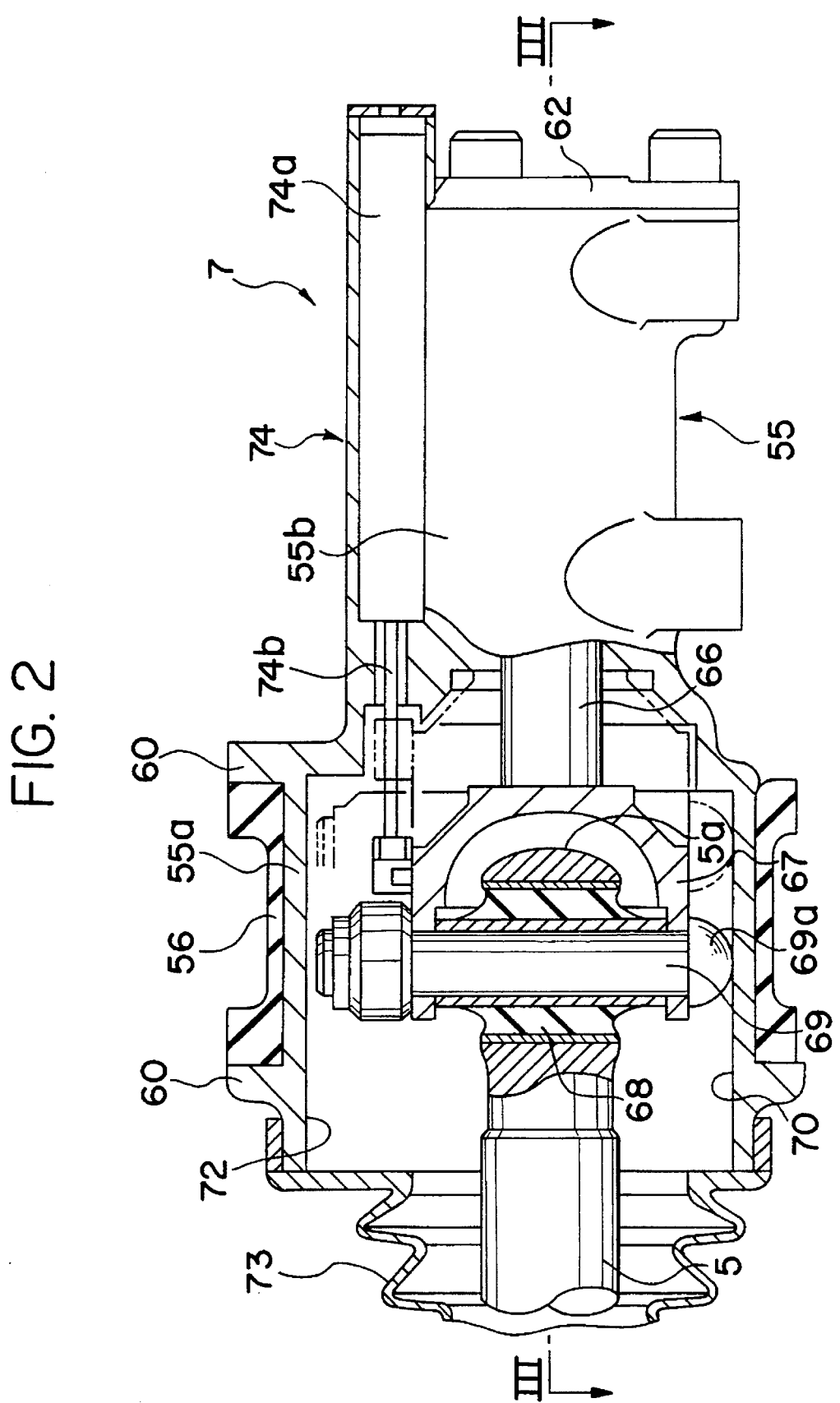
FIG. 2 is a schematic partly cutaway side view of an actuator of an embodiment of the caster angle control apparatus of the present invention.
Figure 3:
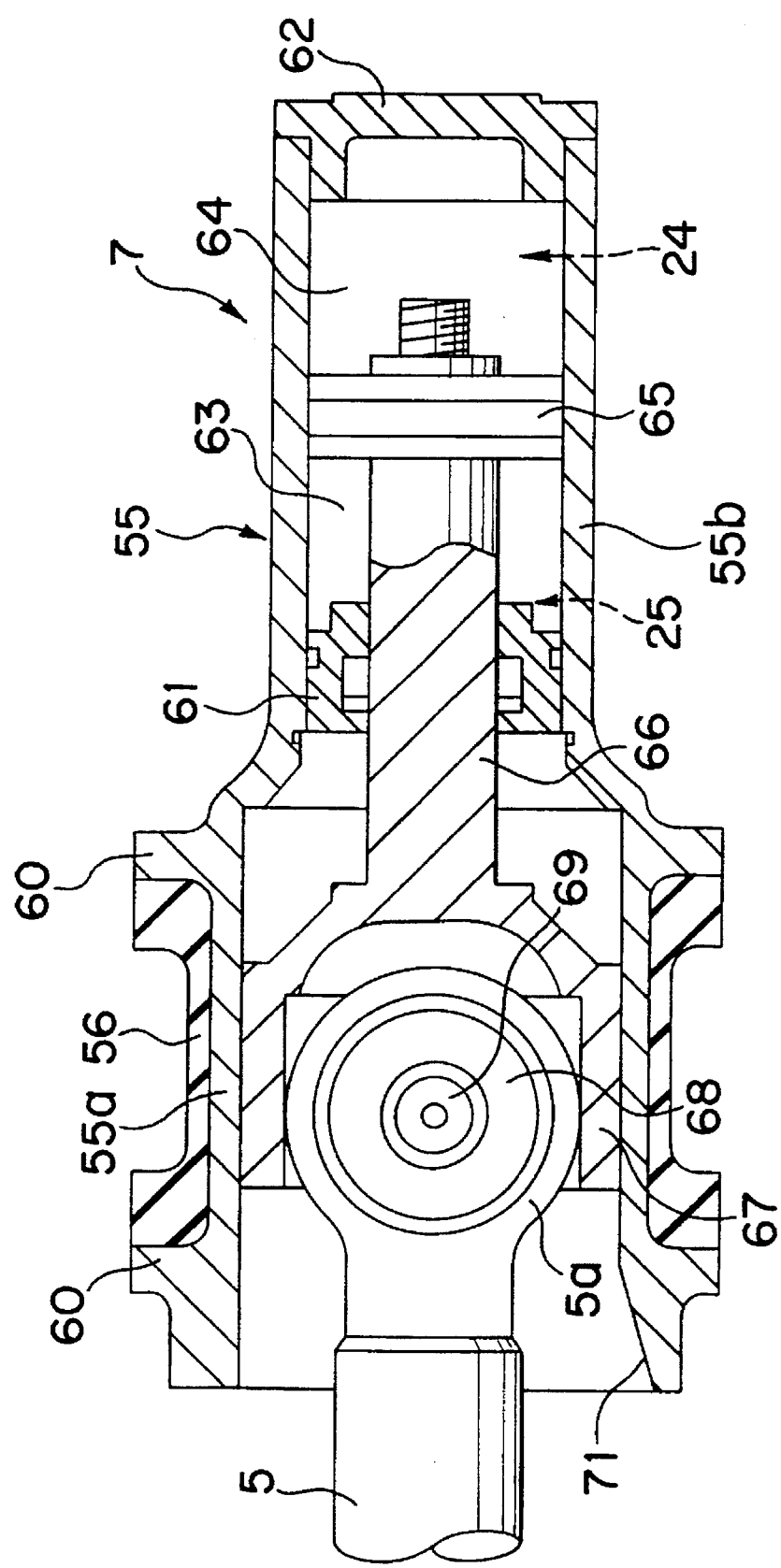
FIG. 3 is a schematic cross sectional view taken along line III—III in FIG. 2.

FIG. 1 is a schematic view showing the structure of an embodiment of the alignment control apparatus of the present invention. FIG. 2 is a schematic partly cutaway view of an actuator. FIG. 3 is a schematic cross sectional view taken along line III—III in FIG. 2. A suspension apparatus 1 is a multi-link type suspension apparatus, for example, which links right and left rear wheels individually to a vehicle body (not shown). FIG. 1 shows the suspension apparatus 1 which links, for example, a left front wheel (hereinafter referred to as "vehicle wheel") 2 to the vehicle body side.

As shown in FIG. 1, the suspension apparatus 1 comprises a knuckle 3 for rotatably supporting the wheel 2, an upper arm 4 for connecting an extension 3a of the knuckle 3 to the vehicle body side, and lower arms 5 and 6 for connecting a lower end of the knuckle 3 to the vehicle body side. An actuator 7 is disposed between the lower arm 5 and the vehicle body, and a caster angle θ of the wheel 2 is set to a desired value by operation of the actuator 7.

The actuator 7 is supplied with hydraulic pressure from a hydraulic pressure source 9 by selecting a flow rate control valve (electromagnetic valve) 8. The electromagnetic valve 8 is changed over in response to a control voltage instructed from an ECU 10. The ECU 10 is inputted with information from a vehicle speed sensor 11, a steering wheel angle sensor 2, a lateral acceleration sensor (lateral G sensor) 13, and a longitudinal acceleration sensor (longitudinal G sensor) 14. The ECU 10 reads a steering wheel angle, a steering wheel angular velocity, a longitudinal G, and a lateral G according to the information obtained from these sensors 11 to 14. Further, the ECU 10 reads a road surface frictional coefficient (road surface μ) calculated according to the hydraulic pressure of a power steering apparatus (not shown).

The ECU 10 calculates a target caster angle according to the steering wheel angle, steering wheel angular velocity, longitudinal G, lateral G, and road surface μ, and outputs a control instruction to the electromagnetic valve 8 to operate the actuator 7 so that the caster angle μ is the target caster angle.

The construction of the actuator 7 will be described with reference to FIGS. 2 and 3. As shown, in the actuator 7, a body 55 is formed of a large-diameter arm support section 55a and a small-diameter cylinder section 55b connected with each other, and mounted to the vehicle body side through a mount rubber 56 between a pair of flanges 60 formed on the outer peripheral surface of the arm support section 55a.

The cylinder section 55b contains a piston 65 which divides a space between a division wall 61 and an end cap 62 into hydraulic pressure chambers 63 and 64, and a front end of a moving rod 66 which integrally reciprocates with the piston 6 slidably penetrates the partition wall 61 and protrudes into the arm support section 55a.

The front end of the moving rod 66 is provided integrally with a cylindrical connection 67, and the connection 67 is connected to be vertically slidable with a ring-formed mounting part 5a of the lower arm 5 by a bolt 69 through a rubber bushing 68.

The connection 67 is supported on the inner peripheral surface of the arm support section 55a to be slidable in the longitudinal direction of the lower arm 5, and supported to be unrotatable by engagement of a semi-spherically-formed bolt head 69a with a semi-spherically sectioned guide groove 70 formed on the inner peripheral surface of the arm support section 55a. In FIG. 3, the reference numeral 71 indicates a relief part when the lower arm 5 swings on the inner peripheral surface of the arm support section 55a.

A mud-proof rubber boot 73 is provided between a front opening of the arm support section 55a and the outer peripheral surface of the lower arm 5. The cylinder section 55b contains a sensor unit 74a of a stroke sensor 74 for detecting dislocation of the moving rod 66. Further, the tip of the a sensor rod 74b engages with the connection 67.

The hydraulic pressure chamber 63 is connected with an oil passage 24, and the hydraulic pressure chamber 64 is connected with an oil passage 25. When hydraulic pressure is supplied from the oil passage 24 to the hydraulic pressure chamber 63, the piston 65 moves forward while discharging oil from the hydraulic pressure chamber 64 to the oil passage 25 to extend the moving rod 66. On the other hand, when hydraulic pressure is supplied from the oil passage 25 to the hydraulic pressure chamber 64, the piston 65 moves in reverse, while discharging oil from the hydraulic pressure chamber 63 to the oil passage 24 to contract the moving rod 66. The caster angle θ is increased when the moving rod 66 extends, and is decreased when the moving rod 66 contracts.

Figure 4:
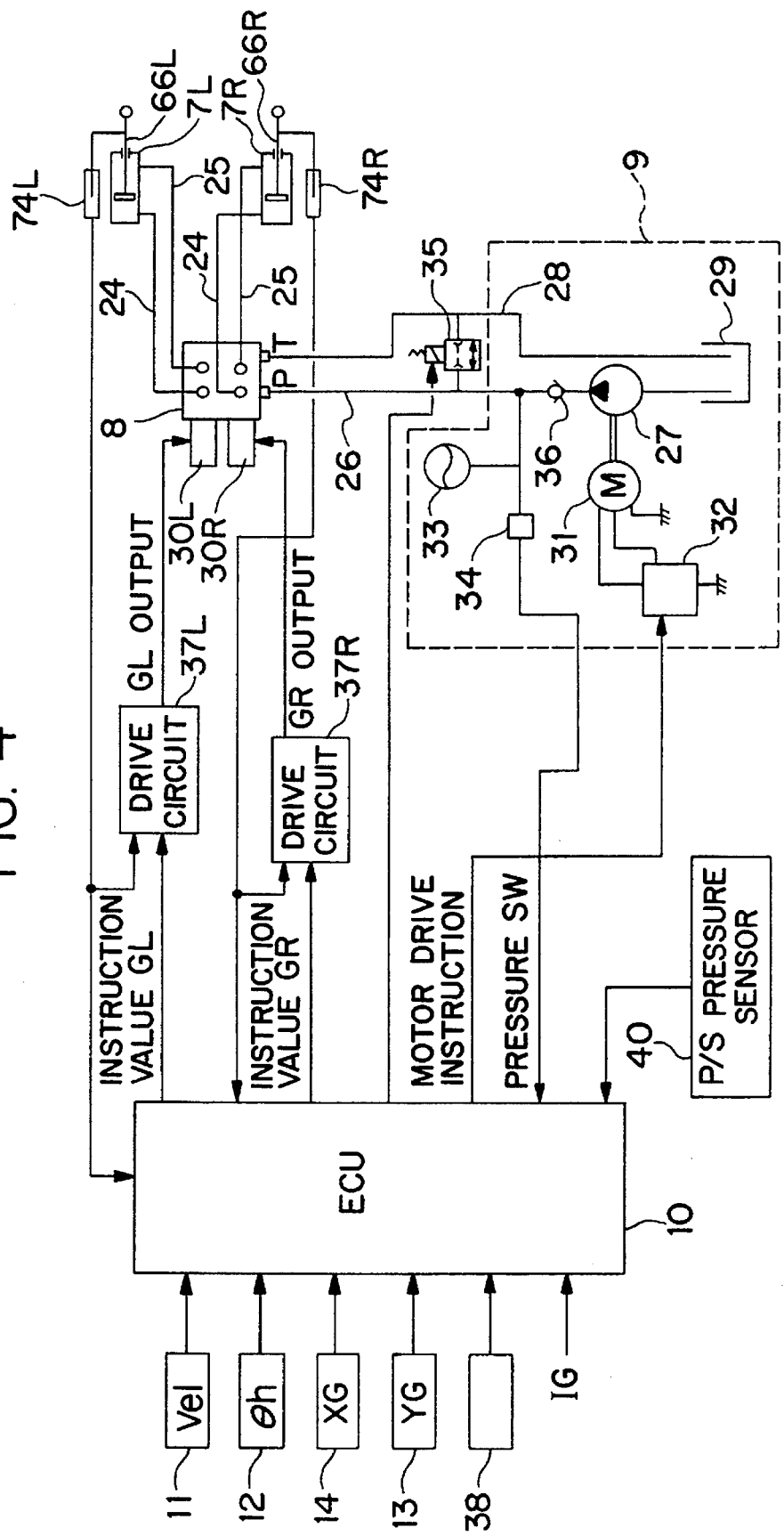
FIG. 4 is a control block diagram of an embodiment of the caster angle control apparatus of the present invention.

The alignment control system will be described with reference to FIG. 4. FIG. 4 is a control block diagram of the front wheel alignment control apparatus. The actuator 7 and the stroke sensor 23 are provided individually for the right front wheel and the left front wheel, with a suffix L for the left front wheel, and a suffix R for the right front wheel.

The actuators 7L and 7R are connected to the electromagnetic valve 8 individually through the oil passages 24 and 25. The electromagnetic valve 8 is connected to a pump 27 through an oil passage 28 and to a reserve tank 29 through an oil passage 28. The electromagnetic valve 8 is provided with valve units connected individually to the oil passages 24 and 25 of the actuators 7L and 7R, and the individual valve units are independently changed over to operate by excitation of different solenoids 30L and 30R. The pump 27 is driven by an electric motor 31, and the electric motor 31 is driven according to an instruction of a drive amplifier 32. The oil passage is connected with an accumulator 33, and pressure of the accumulator 33 is detected by a pressure sensor (pressure switch) 34. When the pressure of the accumulator 33 is lower than a lower limit value, the pressure switch 34 detects it, and a drive instruction is transmitted to the drive amplifier 32 through the ECU 10. The pump 27 is driven when the pressure of the accumulator 33 is below the lower limit value to discharge hydraulic oil to the oil passage 26, and the oil passage 26 is always maintained at a predetermined pressure. That is, the hydraulic pressure source 9 as driver of the actuator 7 comprises the pump 27, the reserve tank 29, the electric motor 31, the accumulator 33, and the like. In the Figure, the reference numeral 35 indicates a relief valve provided over the oil passage 26 and the oil passage 28, which operates according to an instruction of the ECU 10 to make the oil passages 26 and 28 communicate with each other to return hydraulic oil to the reserve tank 29. The reference numeral 36 indicates a check valve for preventing backflow of hydraulic oil to the pump 27 side.

Individual valve chambers of the electromagnetic valve 8 have first to third positions. When each valve chamber is changed over to the first position, the oil passages 24 and 25 and the oil passages 26 and 28 are closed, and movement of the moving rod 66 of the actuator 7 is fixed. When each valve chamber is changed over to the second position, the oil passage 24 and the oil passage 26 communicate with each other and the oil passage 25 and the oil passage 28 communicate with each other to extend the moving rod 66. Further, when each valve chamber is changed over to the third position, the oil passage 24 communicates with the oil passage 28 and the oil passage 25 communicates with the oil passage 26 to contract the moving rod 66.

The solenoids 30L and 30R of the electromagnetic valve 8 are excited by inputting instruction values GL and GR. The instruction values GL and GR are outputted from drive circuits 37L and 37R, and calculated by the ECU 10 to be transmitted to the drive circuits 37L and 37R. Further, detection signals of the stroke sensors 74L and 74R are inputted to the drive circuits 37L and 37R and the ECU 10.

The ECU 10 is inputted with signals from the vehicle speed sensor 11, the steering wheel angle sensor 12, the lateral G sensor 13, and the longitudinal G sensor, and signals from a control switch (CSW) 38 for selecting the control modes (e.g. normal, sports, non-control) and an ignition switch IG. Further, the ECU 10 is inputted with a pump pressure of the power steering apparatus detected by a P/S pressure sensor 40. From the input information, the ECU 10 reads the vehicle speed, the steering wheel angle, the steering wheel angular velocity, and the road surface $\mu$, and calculates and outputs the instruction values GL and GR so that the caster angle $\theta$ is the target caster angle. That is, the ECU 10 acts as a controller, and includes a storage unit, calculation unit, input/output unit, counter used as a timer, and the like..

Then control operation of the ECU 10 will be described in detail with reference to FIG. 5 to FIG. 14. FIG. 5 to FIG. 14 show control flow charts of the alignment control apparatus.

Figure 5:
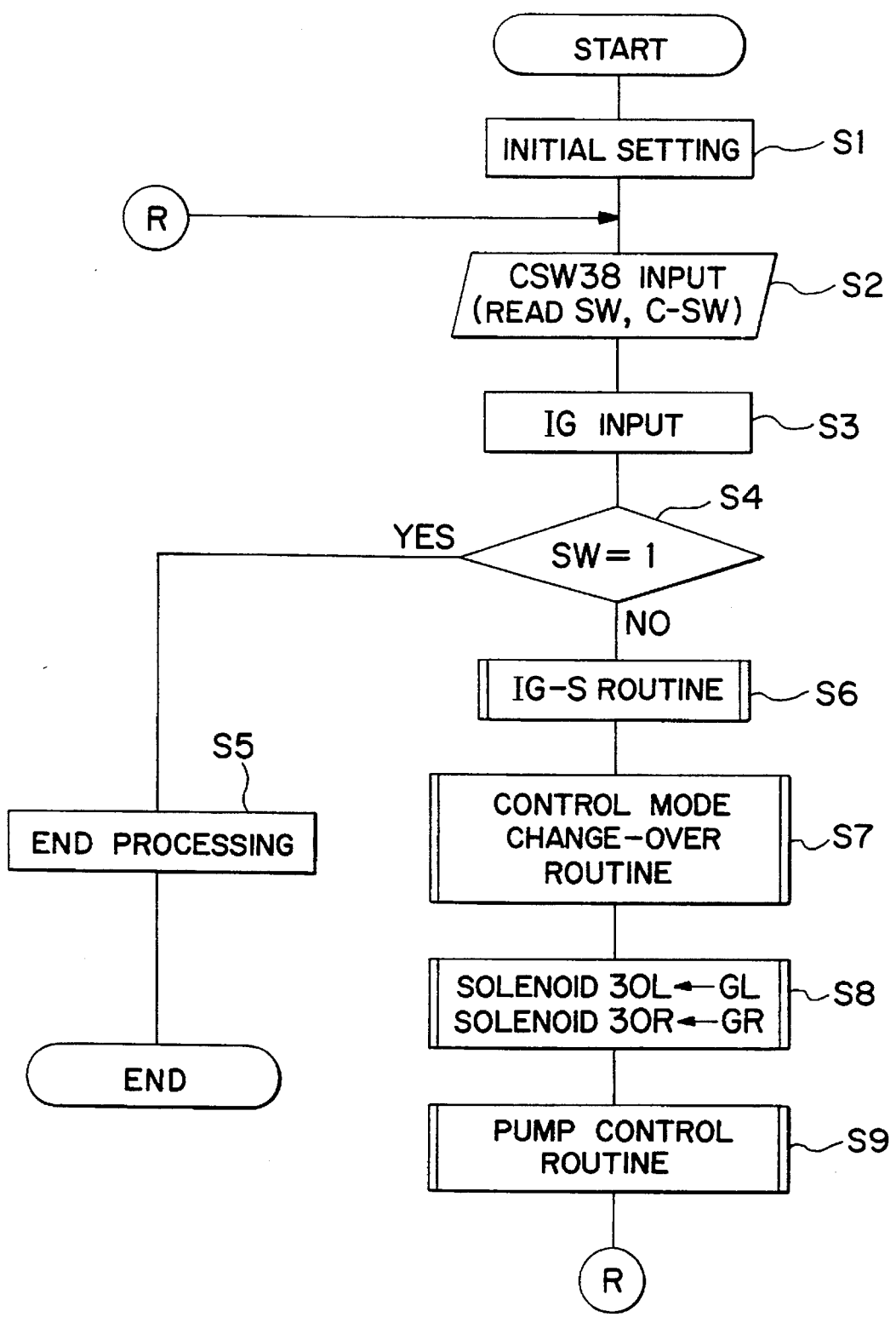
FIG. 5 is a control flow chart (1) of an embodiment of the caster angle control apparatus of the present invention.

As shown in FIG. 5, an initial setting is made in step S1, in which individual control flags are set to zero (non-execution side), and all variables are set to zero. Various coefficients are set to predetermined values (initial values).

In step S2, CSW 38 is inputted so that SW=1 is achieved when CSW 38 is in the non-control position, or SW=0 is achieved when CSW 38 is in the normal position or sports position. With SW=0, when CSW 38 is in the normal position by the control mode, C-SW=2, and when CSW 38 is in the sports position, C-SW=1. In step 3, the signal of the ignition switch IG is read to input whether or not the engine is started (IG is ON or OFF). In step 4, a determination is made as to whether or not SW=1. When SW=1, that is, when CSW 38 is determined to be in the non-control position, end processing is made in step S5, and a message of no alignment control is displayed.

When SW=0 in step S4, that is, CSW 38 is determined to be in the normal position or sports position, an operation mode (IG-S) routine (FIG. 6 to FIG. 8) is executed in step S6. Then, in step S7, a control mode change-over routine (FIG. 9, FIG. 10) is executed, where the instruction values GL and GR according to the control mode are set. After the instruction values GL and GR are set in step S7, they are inputted to the solenoids 30L and 30R in step S8, and the actuator 7 is operated by the electromagnetic valve 8 to set the vehicle wheel 2 to the target caster angle. Then, in step S9 a pump control routine (FIGS. 13, 14) is executed to control driving the pump 27, and the processing returns to step S2.

The IG-S routine in step S6 will be described with reference to FIG. 6 to FIG. 8. The IG-S routine is to stepwise change over the control mode, wherein the control mode IG-S includes five conditions, an OFF condition (IG-S=0), a preparation condition (IG-S=1), a control execution condition (IG-S=2), an end preparation condition (IG-S=3), an end condition (IG-S=4), and a second preparation condition (IG-S=5) for receiving various switches.

Figure 6:
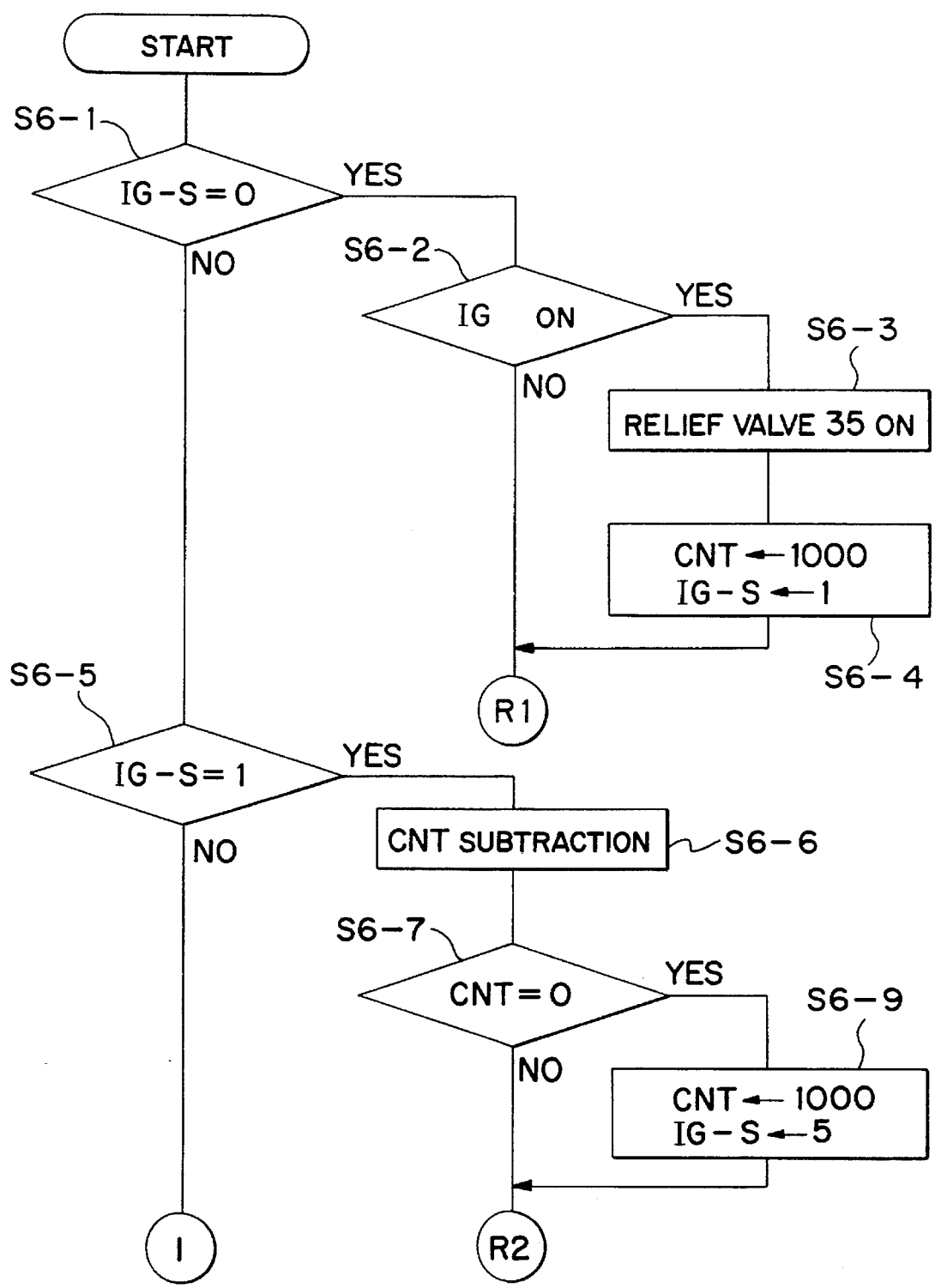
FIG. 6 is a control flow chart (2) of an embodiment of the caster angle control apparatus of the present invention.

As shown in FIG. 6, a determination is made in step S6-1 as to whether or not IG-S=0. Since the initial setting is IG-S=0, the processing proceeds to step S6-2, where a determination is made as to whether or not IG is ON, that is, whether or not the engine has been started. When it is determined in step S6-2 that IG is OFF, the processing returns to the main flow chart. When it is determined that IG is ON, the relief valve 35 is set ON in step S6-3, and a counter CNT is set to 1000 (corresponds to 5 seconds) to set IG-S to 1. Then the processing returns to the main flow chart.

In the next processing, a determination is made again in step S6-1 as to whether or not IG-S=0. Since IG-S is set to 1 in step S6-4, the processing proceeds to step S6-5 where a determination is made as to whether or not IG-S=1. The counter CNT is subtracted in step S6-6, and a determination is made in step S6-7 as to whether or not counter CNT=0. When the counter CNT is not 0, that is, until 5 seconds is elapsed after the counter CNT is set to 1000 in step S6-4 to achieve the preparation condition, the sensor value is read in step S6-8 shown in FIG. 8, and the processing returns to the main flow chart. This procedure is repeated until CNT=0 in step S6-7. When it is determined that counter CNT=0 in step S6-7 (5 seconds is elapsed after preparation is achieved), the counter CNT is set to 1000 in step S6-9 to set IG-S to 5, and the processing returns to the main flow chart.

Again in step S6-5, a determination is made as to whether or not IG-S=1. Since IG-S is set to 5 in step S6-9, the processing proceeds to step S6-10 shown in FIG. 7 where a determination is made as to whether or not IG-S=5. Since IG-S is 5, the counter CNT is subtracted in step S6-11, and a determination is made in step S6-12 as to whether or not counter CNT=0. When the counter CNT is not 0, that is, before 5 seconds has elapsed after the counter CNT is set to 1000 in step S6-9 (FIG. 6) to achieve the second preparation condition, the sensor value is read in step S6-8 shown in FIG. 8, and the processing returns to the main flow chart.

The above procedure is repeated until counter CNT=0 in step S6-12. When it is determined that counter CNT=0. (5 seconds has elapsed after the second preparation is achieved) in step S6-12, IG-s is set to 2 in step S6-13, and a determination is made in step S6-14 as to whether or not c-SW=2. Since SW=0 is determined in step S4 (FIG. 5), C-SW is 1 or 2, that is, CSW 38 is changed over to the normal position (C-SW=2) or the sports position (C-SW=1). When C-SW=2 is determined in step S6-14, the control gain kkg is set to 0 in step S6-15, and the processing proceeds to step S6-8 (FIG. 8). When C-SW=2 has not been determined, that is, C-SW=1 is determined in step S6-14, the control gain kkg is set to 400 in step S6-16, and the processing proceeds to step S6-8 (FIG. 8). That is, after the control mode is set to the control execution mode (IG-S=2), the control gain kks is set according to the control mode.

Again in step S6-10, a determination is made as to whether or not IG-S=5. Since IG-S is set to 2 in step S6-13, the processing proceeds to step S6-17 where a determination is made as to whether or not IG-S=2. Since IG-S is 2, a determination is made in step S6-18 as to whether IG is OFF, that is, whether or not the engine is in a standstill position.

When the engine is not in a standstill position, the processing proceeds to step S6-8 to continue execution of control. When IG is determined to be OFF in step S6-18, that is, the engine is in a standstill position, the counter CNT is set to 200 (corresponds to 1 second) in step S6-19, and IG-S set to 3, the relief valve 35 is turned OFF in step S6-20, and the processing proceeds to step S6-8.

Again in step S6-17, a determination is made as to whether or not IG-S=2. Since IG-S is set to 3 in step S6-19, the processing proceeds to step S6-21 where a determination is made as to whether or not IG-S=3. Since IG-S is 3, the counter CNT is subtracted in step S6-22, and a determination is made in step S6-23 as to whether or not counter CNT=0. When it is determined that the counter CNT is not 0, that is, before 1 second has elapsed after the counter CNT is set to 200 in step S6-19 to achieve the end preparation, the processing proceeds to step S6-8. When it is determined that counter CNT=0 in step S6-23 (1 second is elapsed after end preparation), the counter CNT is set to 200 to set IG-S to 0 in step S6-24, and the processing proceeds to step S6-8.

Figure 7:
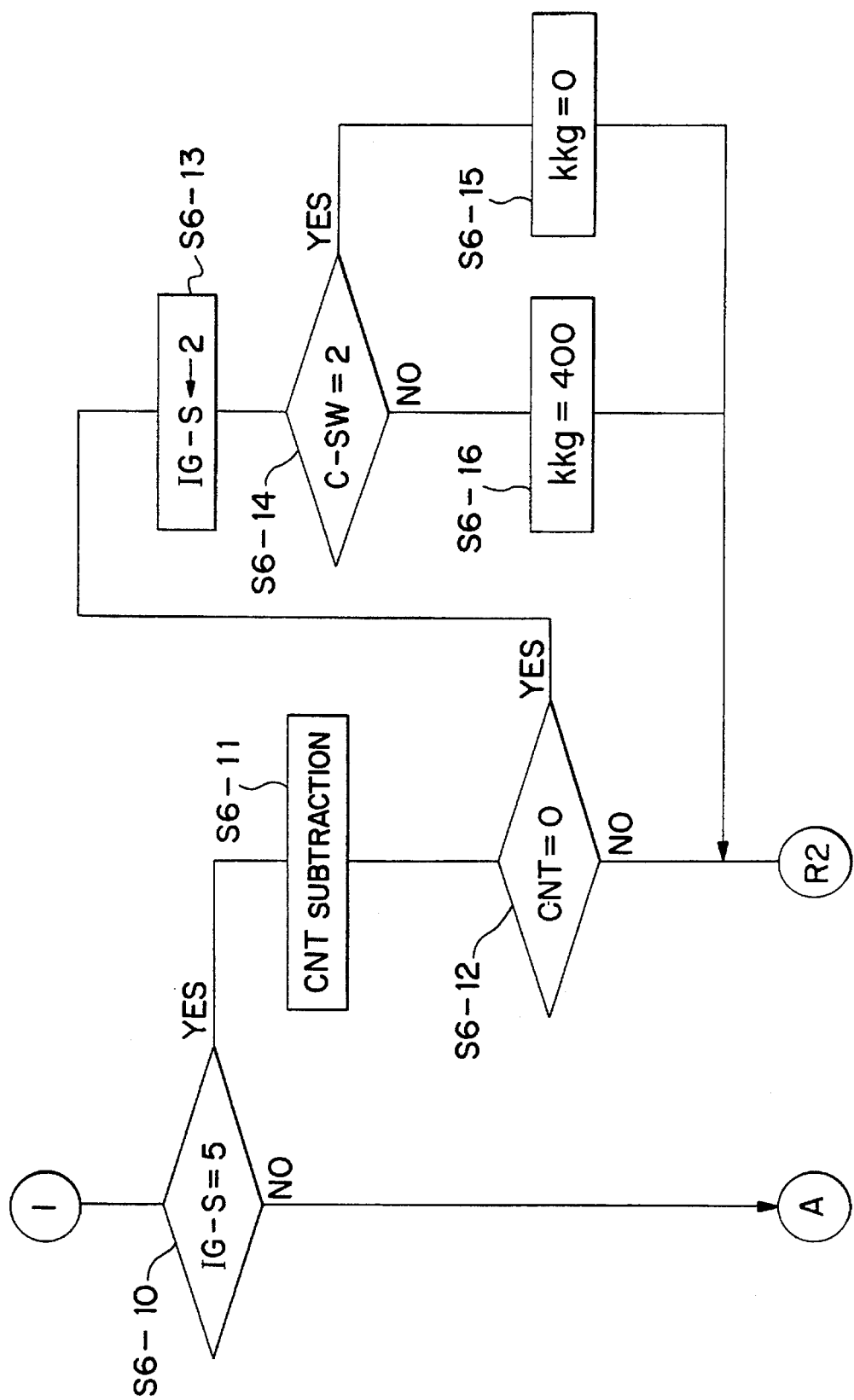
FIG. 7 is a control flow chart (3) of an embodiment of the caster angle control apparatus of the present invention.
Figure 8:
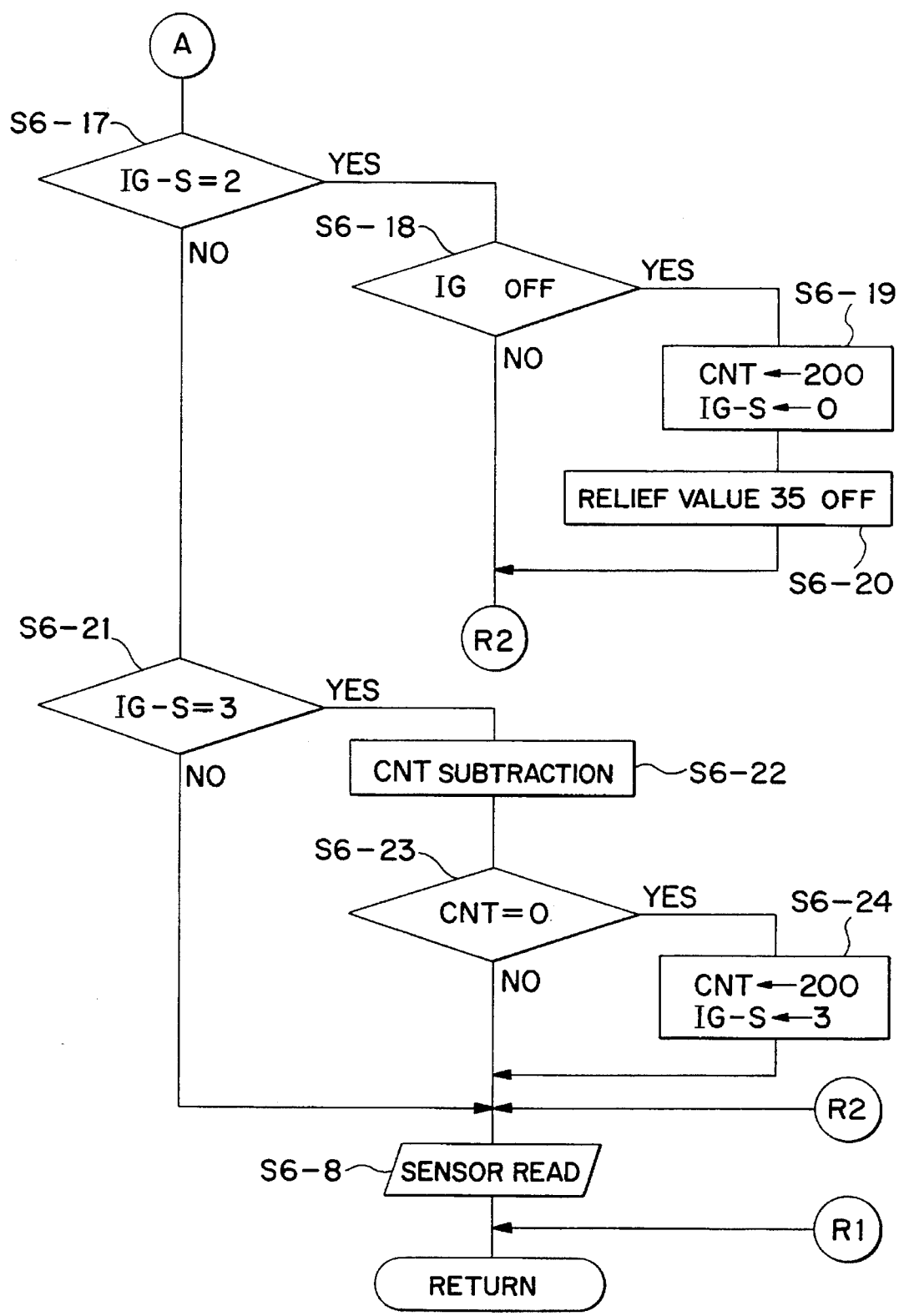
FIG. 8 is a control flow chart (4) of an embodiment of the caster angle control apparatus of the present invention.

In the IG-S routine shown in FIGS. 6 to 8, five operation modes are stepwise selected, in the condition of IG-S=5, input of CSW 38 is first accepted to execute the control. This thereby prevents direct execution of control according to the sensor output. This prevents the caster angle from being changed immediately when IG is turned ON, thereby preventing the driver from an unusual feeling at starting of the engine.

The control mode change-over routine in step S7 will be described with reference to FIGS. 9 and 10. The control mode change-over routine, when the control mode is changed, is to gradually vary the control gain kkg (0 to 400) to eliminate shocks due to abrupt operation of the actuator 7.

Figure 9:
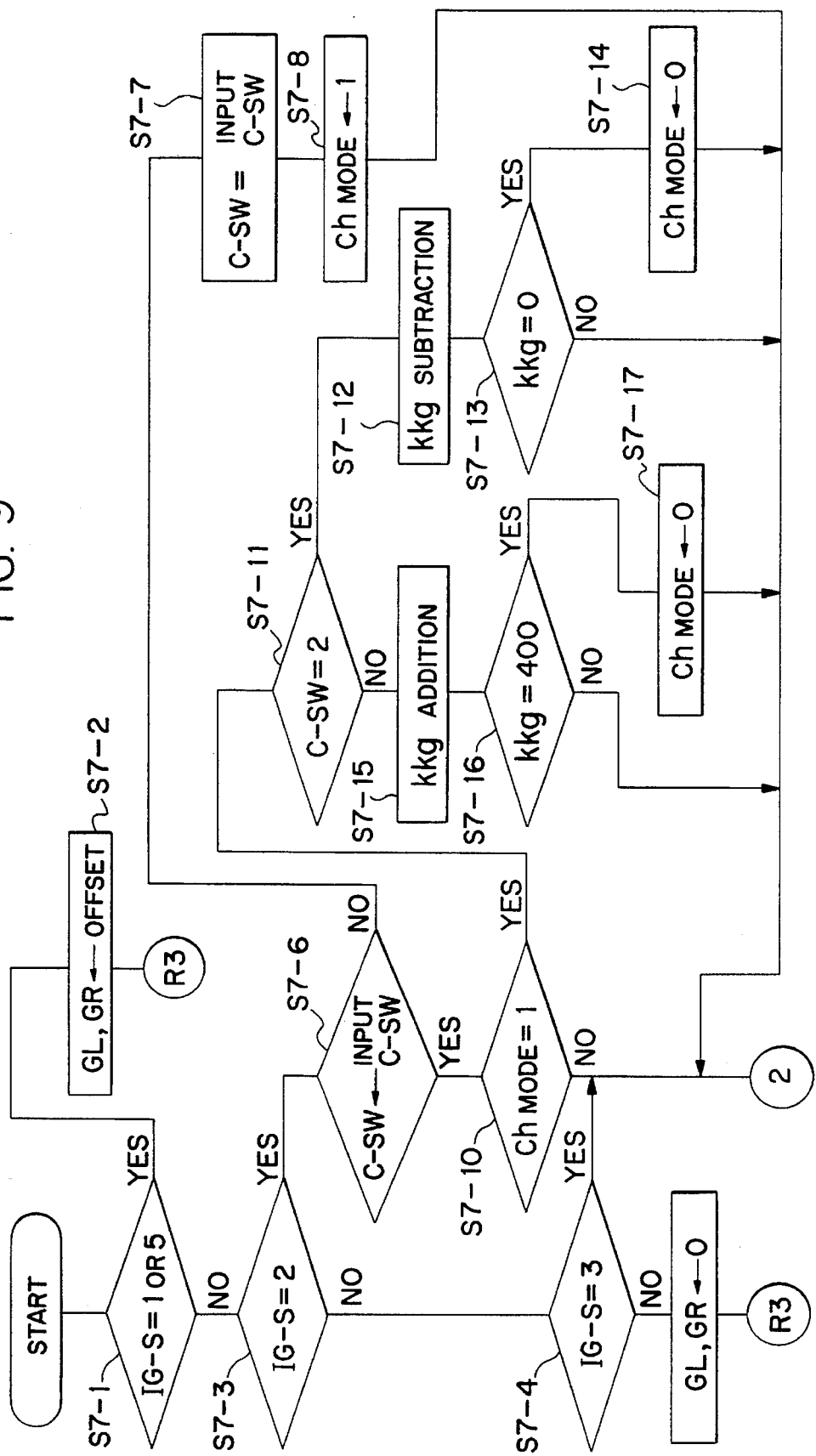
FIG. 9 is a control flow chart (5) of an embodiment of the caster angle control apparatus of the present invention.
Figure 10:
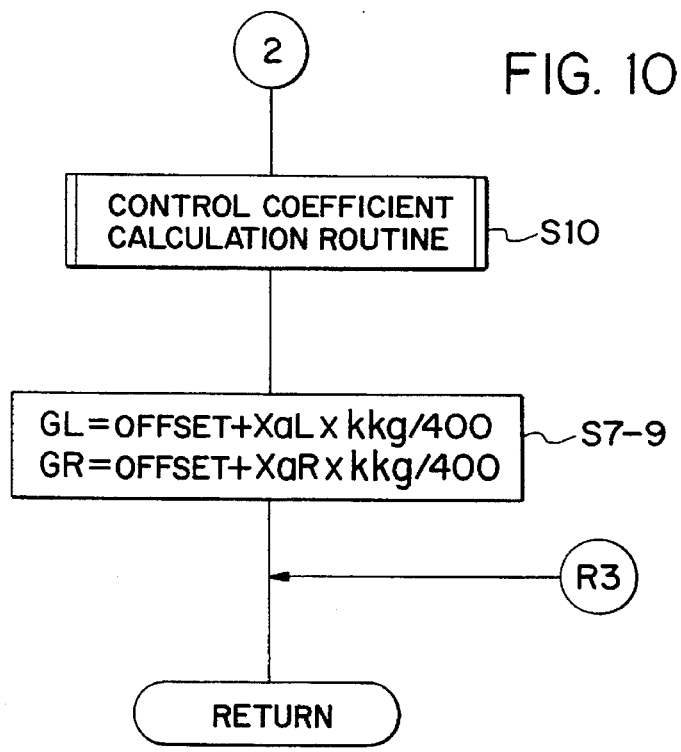
FIG. 10 is a control flow chart (6) of an embodiment of the caster angle control apparatus of the present invention.

As shown in FIG. 9, a determination is made in step S7-1 as to whether or not IG-S is 1 or 5. When IG-S is determined to be 1 or 5, in step S7-2 the instruction values GL and GR inputted to the solenoids 30L and 30R of the electromagnetic valve 8 are set to predetermined initial values (offset), and the processing returns to the main flow chart. When, in step S7-1, IG-S is determined to be other than 1 or 5, a determination is made in step S7-3 as to whether or not IG-S=2. When IG-S=2 is not determined in step S7-3, a determination is made in step S7-4 as to whether or not IG-S=3. When IG-S=3 is not determined in step S7-4, that is, IG-S=4 is determined, the instruction values Gl and GR are set to 0 in step S7-5 to turn OFF the current of the solenoids 30L and 30R, and the processing returns to the main flow chart.

On the other hand, when IG-S=2 is determined in step S7-3, a determination is made in step S7-8 as to whether or not the CSW 38 input is stored at the same location, that is, the input C-SW is the same as the stored C-SW. When the stored C-SW is determined to be different from the input C-SW, that is, the control mode is determined to have been changed, the stored C-SW is substituted by the input C-SW in step S7-7, a change mode ChMode is set to 1 in step S7-8, and the processing proceeds to a control coefficient calculation routine of step S10 shown in FIG. 10. After control coefficients XaL and XaR are determined (details will be described later) in the control coefficient calculation routine of step S10, the instruction values GL and GR are calculated by the equations of step S7-9. That is, in step S7-9, the instruction values Gl and GR are calculated from the control coefficients XaL and XaR $$GL = \text{offset} + XaL \times kkg/400$$

$$GR = \text{offset} + XaR \times kkg/400,$$

after that, the processing returns to the main flow chart,

A determination is made in step S7-6 as to whether or not stored C-SW is the same as input C-SW. When stored C-SW is determined to be the same as input C-SW, that is, the control mode is not changed or, even if changed, processing in steps S7-7 and S7-8 is completed, a determination is made in step S7-10 as to whether or not change mode ChMode=1. When it is determined to be not change mode ChMode=1, that is, the control mode is not changed, the processing proceeds to step S10.

When change mode ChMode=1 is determined, that is, the control mode is changed and the processing of steps S7-7 and S7-8 is completed, a determination is made in step S7-11 as to whether or not C-SW=2, that is, whether or not the control mode is normal.

When C-SW=2 (normal) is determined in step S7-11, the control gain kkg is subtracted in step S7-12, and a determination is made in step S7-13 as to whether or not the control gain kkg is 0. When the control gain kkg is determined not to be 0, the processing proceeds to step S10 (FIG. 10). The control gain kkg is again subtracted in step S7-12, and the procedure is repeated until the control gain is 0. When control gain kkg=0 is determined in step S7-13, the change mode ChMode is set to 0 in step S7-14, and the processing proceeds to step S10 (FIG. 10). That is, when the control mode is changed to normal, the control gain kkg is repeatedly subtracted and the instruction values G1 and GR are calculated every time, so that the instruction values GL and GR are gradually changed until the control gain kkg is 0.

When C-SW=2 is not determined in step S7-11, that is, C-SW (sports) is determined, the control gain kkg is added in step S7-15, and a determination is made in step S7-16 as to whether or not the control gain kkg is 400. When it is determined that the control gain kkg is not 400, the processing proceeds to step S10 (FIG. 10). In step S7-17 the control gain kkg is again added, and the procedure is repeated until the control gain kkg is 400. When it is determined that control gain kkg=400 in step S7-16, the change mode ChMode is set to 0 in step S7, and the processing proceeds to step S10 (FIG. 10). That is, when the control mode is changed to sports, the control gain kkg is repeatedly added and the instruction values GL and GR are calculated every time, so that the instruction values GL and GR are gradually changed until the control gain kkg is 400.

When the control mode is changed over to change the control gain kkg, by providing the control mode change-over routine which is a function to gradually change the control gain kkg, the instruction values GL and GR inputted to the solenoids 30L and 30R of the electromagnetic valve 8 are gradually changed, thereby eliminating shocks due to abrupt operation of the actuator 7 even though the control mode is changed over.

The control coefficient calculation routine in step S10 will be described with reference to FIGS. 11 and 12. The control coefficient calculation routine calculates the control coefficients XaL and XaR according to the vehicle speed Vel, the steering wheel angle $\theta h$, the steering wheel angular velocity $\theta hs$, and the road surface $\mu$, wherein the control coefficients XaL and XaR are coefficients for calculating the instruction values GL and GR to operate the actuator 7 when the actual caster angle is the target caster angle. Further, the control coefficient calculation routine sets the control coefficients XaL and XaR so that the actuator 7 at the outer wheel side of turning of the vehicle is operated by a calculated lateral acceleration (Yga).

Figure 11:
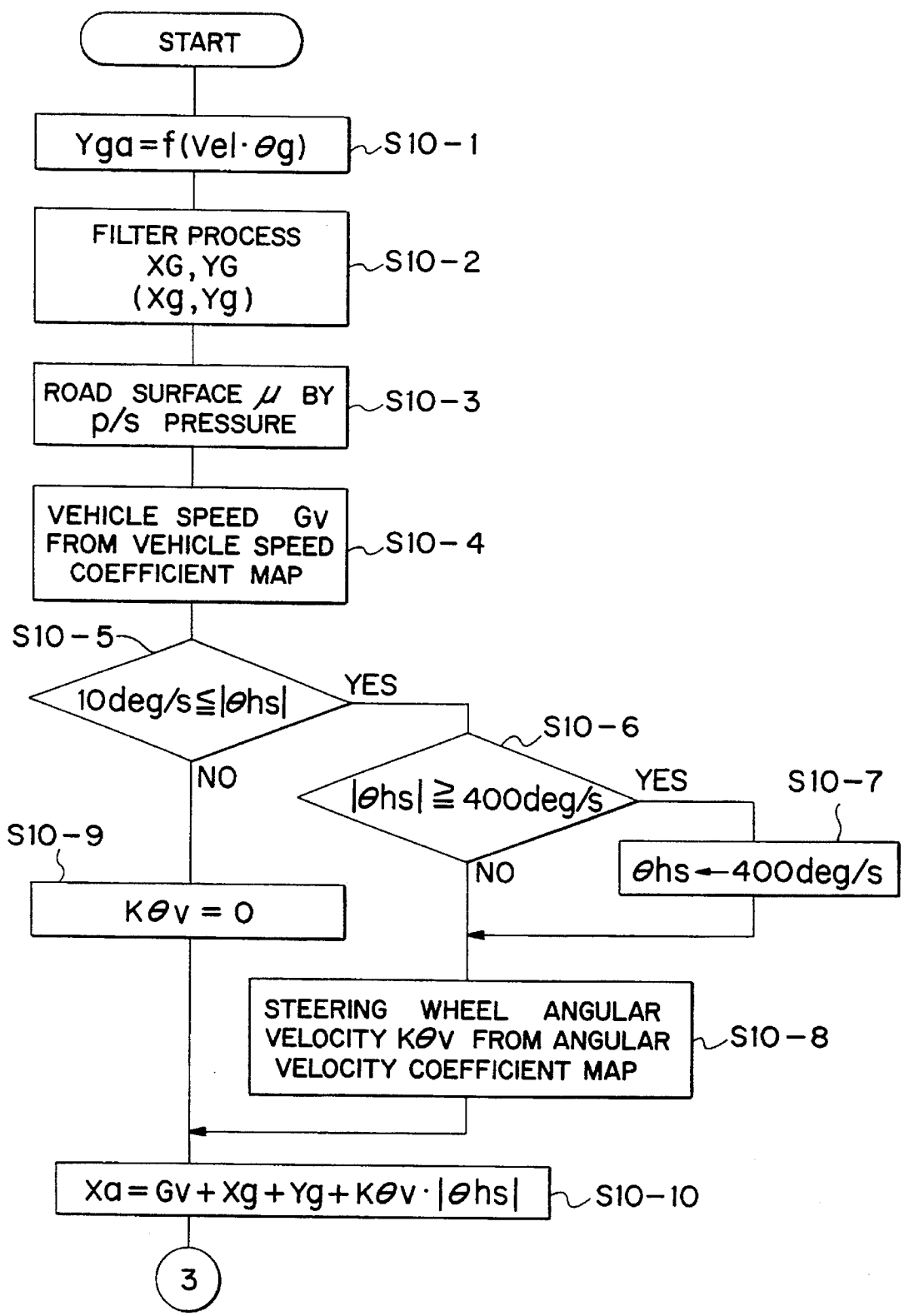
FIG. 11 is a control flow chart (7) of an embodiment of the caster angle control apparatus of the present invention.
Figure 14:
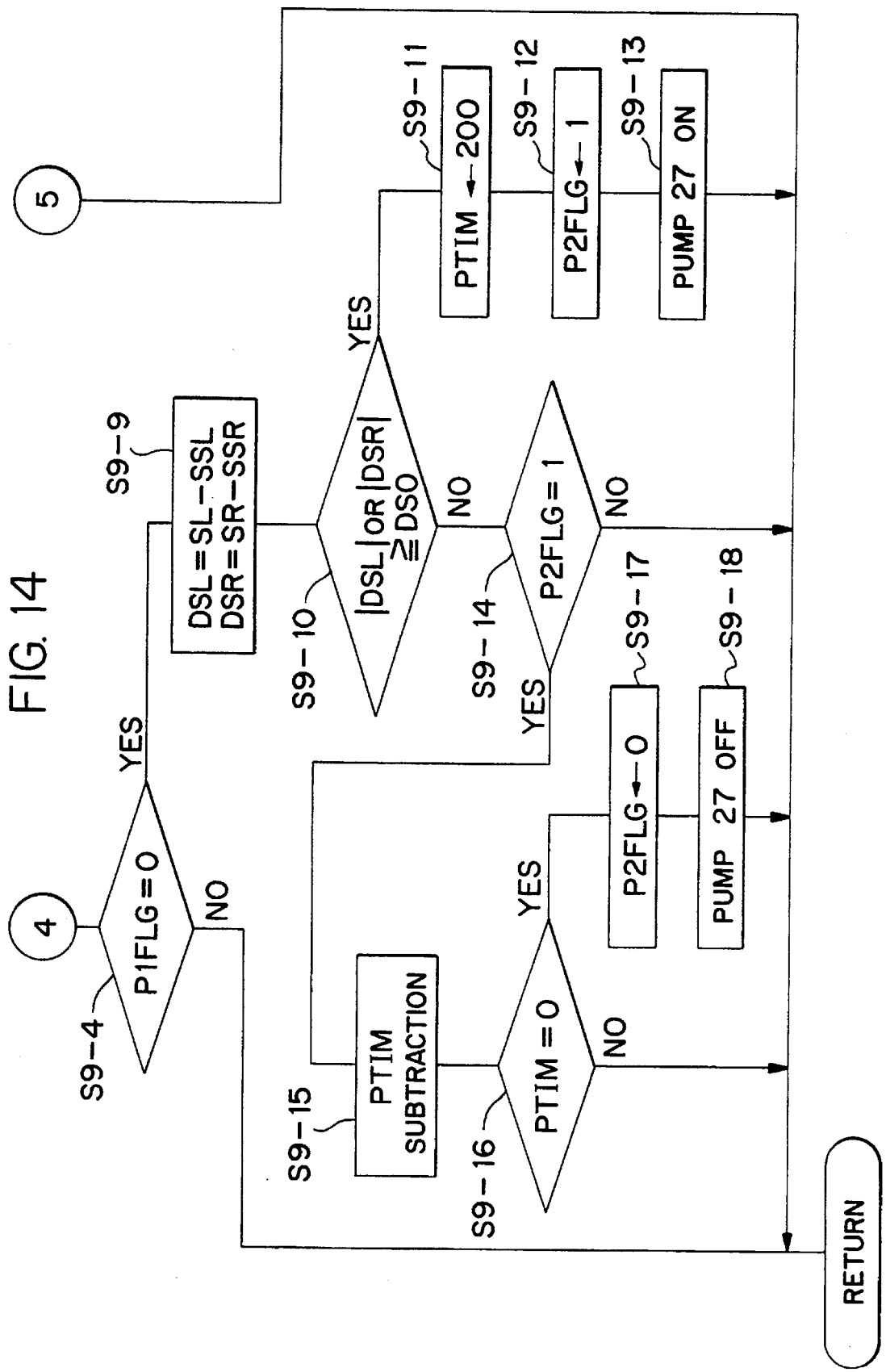
FIG. 14 is a control flow chart (10) of an embodiment of the caster angle control apparatus of the present invention.

As shown in FIG. 11, the calculated lateral acceleration Yga is calculated in step S10-1 according to the vehicle speed Vel and the steering wheel angle θh (Yga=f(Vel.θh)). In step S10-2 detection values XG and YG of the longitudinal G sensor 14 and the lateral G sensor 13 are filtered to obtain Xg and Yg. Then, in step S10-3, the road surface μ is calculated according to the detection value of the P/S sensor 40, and a vehicle speed coefficient Gv is read from a vehicle speed coefficient map in step S10-4. In the vehicle speed coefficient map, as shown in FIG. 14, the vehicle speed coefficient Gv is set according to the vehicle speed Vel. Further, the vehicle speed coefficient Gv is set so that it increases from a negative value to 0, for example, in a region where the vehicle speed Vel is up to 40 km/h, and increases from 0 to a positive value in a region of over 40 km/h.

Then, a determination is made in step S10-5 as to whether or not an absolute value |θhs| of the steering wheel angular velocity θhs is not less than 10 deg/s. When the absolute value |θhs| of the steering wheel angular velocity θhs is not less than 10 deg/s, a determination is made in step S10-6 as to whether or not it is not less than 400 deg/s. When it is determined that the absolute value |θhs| of the steering wheel angular velocity θhs is not less than 400 deg/s, the steering wheel angular velocity θhs is set to 400 deg/s in step S10-7, and a steering wheel angular velocity coefficient Kθv is read from an angular velocity map in step S10-8. When the absolute value |θhs| of the steering wheel angular velocity θhs is determined to be less than 400 deg/s, the steering angular velocity coefficient Kθv is read in step S10-8.

Figure 15:
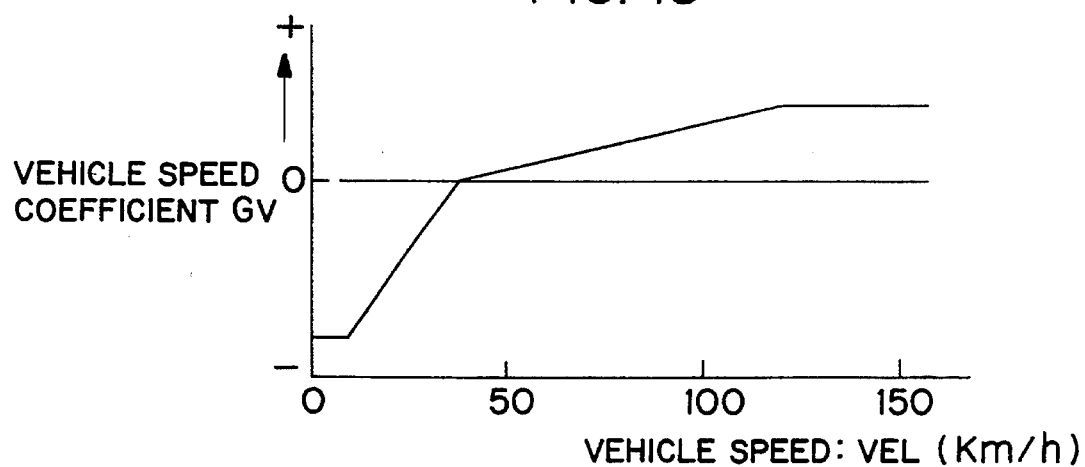
FIG. 15 is an example of a vehicle speed coefficient map according to the vehicle speed.

In the angular velocity map, as shown in FIG. 15, the steering wheel angular velocity Kθv is set according to the vehicle speed Vel, and the value is set to a greater value for a low μ road (indicated by the dotted line in the Figure) then a high μ road (indicated by the solid line).

Figure 16:
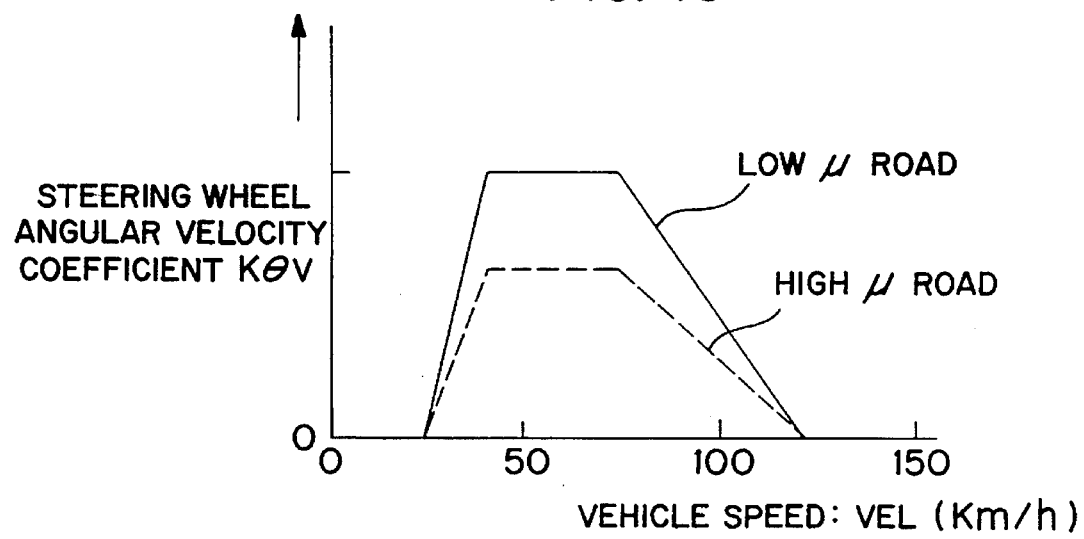
FIG. 16 is an example of a steering wheel angular velocity coefficient map according to the vehicle speed.
Figure 17:
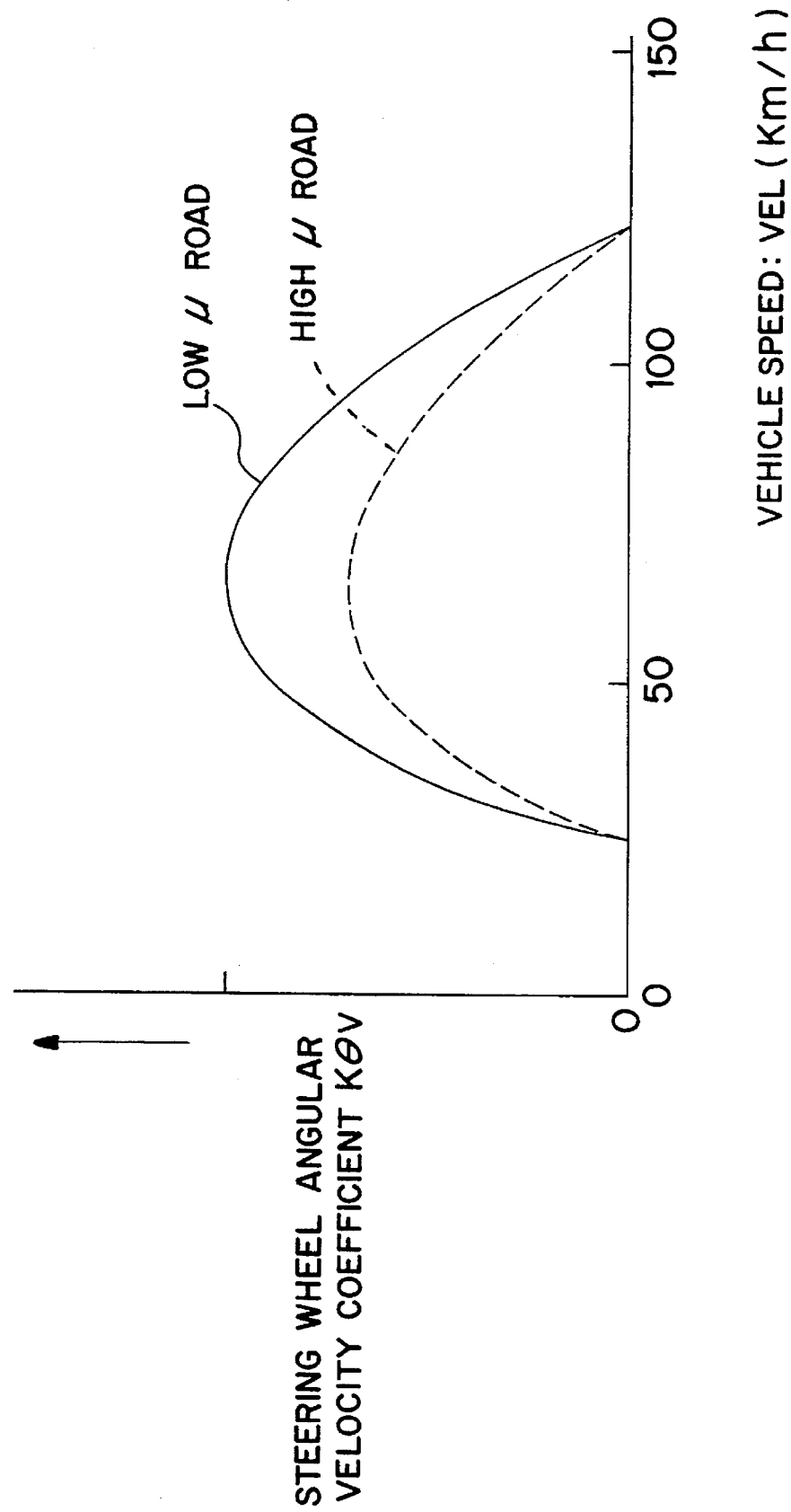
FIG. 17 is another example of a steering wheel angular velocity coefficient map according to the vehicle speed.

Further, the angular velocity map may be such that, as shown in FIG. 17, the steering angular velocity coefficient Kθv has a maximum value at a preset vehicle speed, the value increases as the vehicle speed increases in a region below the preset vehicle speed, and the value decreases as the vehicle speed increases in a region over the preset vehicle speed. Also in such a map, as in the map shown in FIG. 16, the value is set to a greater value for a low μ road (dotted line) compared to a high μ road.

Naturally, although in the maps of FIGS. 16 and 17, the steering angular velocity coefficient Kθv is set in two stages of low μ road and high μ road, this may be set in multiple stages or stepless.

On the other hand, when the absolute value |θhs| of the steering wheel angular velocity θhs is determined to be less than 10 deg/s in step S10-5, the steering wheel angular velocity Kθv is set to 0 in step S10-9.

After the steering wheel angular velocity coefficient Kθv is read in step S10-8, or after the steering wheel angular velocity coefficient Kθv is set to 0 in step S10-9, a sub-coefficient Xa for setting the control coefficients XaL and XaR is calculated by an equation of step S10-10. That is, in step S10-10, the sub-coefficient Xa is calculated according to the vehicle speed coefficient Gv, the filtered Xg and Yg, the steering wheel angular velocity coefficient Kθv, and the absolute value |θhs| of the steering wheel angular velocity θhs, $$Xa=Gv+Xg+Yg+K\theta v.|\theta hs|.$$

That is, the sub-coefficient Xa is calculated according to the vehicle speed Vel, the steering wheel angle θh, the steering wheel angular velocity θhs, and the road surface μ.

Figure 12:
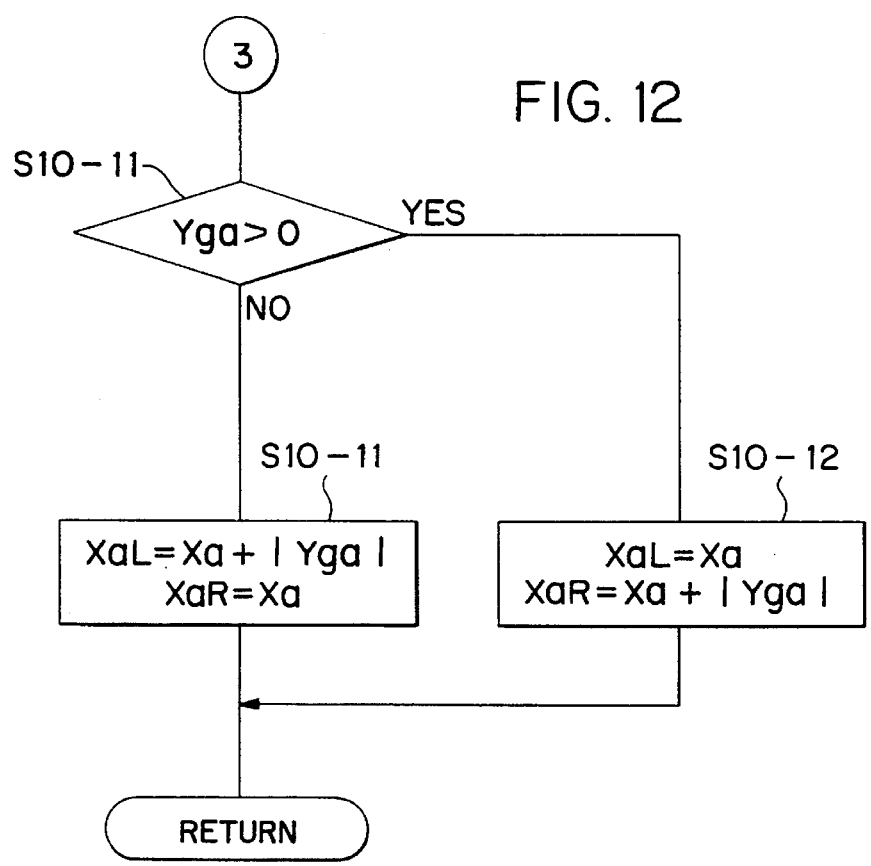
FIG. 12 is a control flow chart (8) of an embodiment of the caster angle control apparatus of the present invention.

After the sub-coefficient Xa is calculated in step S10-10, as shown in FIG. 12, the sign of the calculated lateral acceleration Yga, that is, the turning direction of the vehicle is determined in step S10-11. When the calculated lateral acceleration Yga is determined in step S10-11 to be positive, the vehicle is turning to the left. In step S10-12 the control coefficient XaR for operating the actuator 7R for the right front wheel, which is the outer wheel of turning, is set to Xa+|Ygal. Further, the control coefficient XaL for operating the actuator 7L for the left front wheel is set to the sub-coefficient Xa. The processing then returns to the main flow chart. When the calculated lateral acceleration Yga is determined in step S10-11 to be negative, the vehicle is turning to the right. In step S10-13 the control coefficient XaL for operating the actuator 7L for the left front wheel, which is the outer wheel of turning, is set to sub-coefficient Xa+|Ygal. Further, the control coefficient XaR for operating the actuator 7R for the right front wheel is set to the sub-coefficient Xa. The processing then returns to the main flow chart. That is, steps S10-11, S10-12, and S10-13 have a function to increase the operation control amount of the actuator for the outer side wheel of turning.

Therefore, since the control coefficients XaL and XaR for the outer side wheel of turning are set reflecting the calculated lateral acceleration Yga, the caster angle of the outer wheel of turning is increased by the component of the calculated lateral acceleration Yga.

In the control coefficient calculation routine shown in FIGS. 11 and 12, since the control coefficients for calculating the instruction values GL and GR for operating the actuator 7 are set according to the vehicle speed Vel, the steering wheel angle θh, the steering wheel angular velocity θhs, and the road surface μ, the caster angle can be increased according to the turning condition of the steering wheel during changing lanes or the like, thereby enhancing the convergence of the vehicle. Further, since the actuator 7 of the outer side wheel of turning is operated by the component of the calculated lateral acceleration Yga to increase the caster angle, the righting moment of the outer wheel of turning, which is applied with a large lateral force during turning, is even further increased, thereby enhancing the stability of the vehicle.

Returning to the main flow chart shown in FIG. 5, the control mode is changed over in step S7, then the instruction values GL and GR are calculated according to the control coefficients XaL and XaR set in the control coefficient calculation routine in FIGS. 11 and 12. Further, the instruction values GL and GR are inputted to the solenoids 30L and 30R in step S8. Finally, the actuator 7 is operated by the electromagnetic valve 8 to change the caster angle of the wheel 2. After that, the pump control routine is executed in step S9.

The pump control routine in step S9 will be described with reference to FIGS. 13 and 14. In the pump control routine, even under the condition that the pressure of the accumulator 33 is below a lower limit and the pump 27 is to be stopped, when differences |DSL| and |DSR| between actual strokes SSL and SSR of the actuator 7 detected by the stroke sensor 74 and instruction strokes SL and SR exceed a preset value DSO, the pump 27 is driven. Further, drive and stop of the pump 27 is caused to follow ON and OFF of the pressure switch 34 with a certain allowance.

Figure 13:
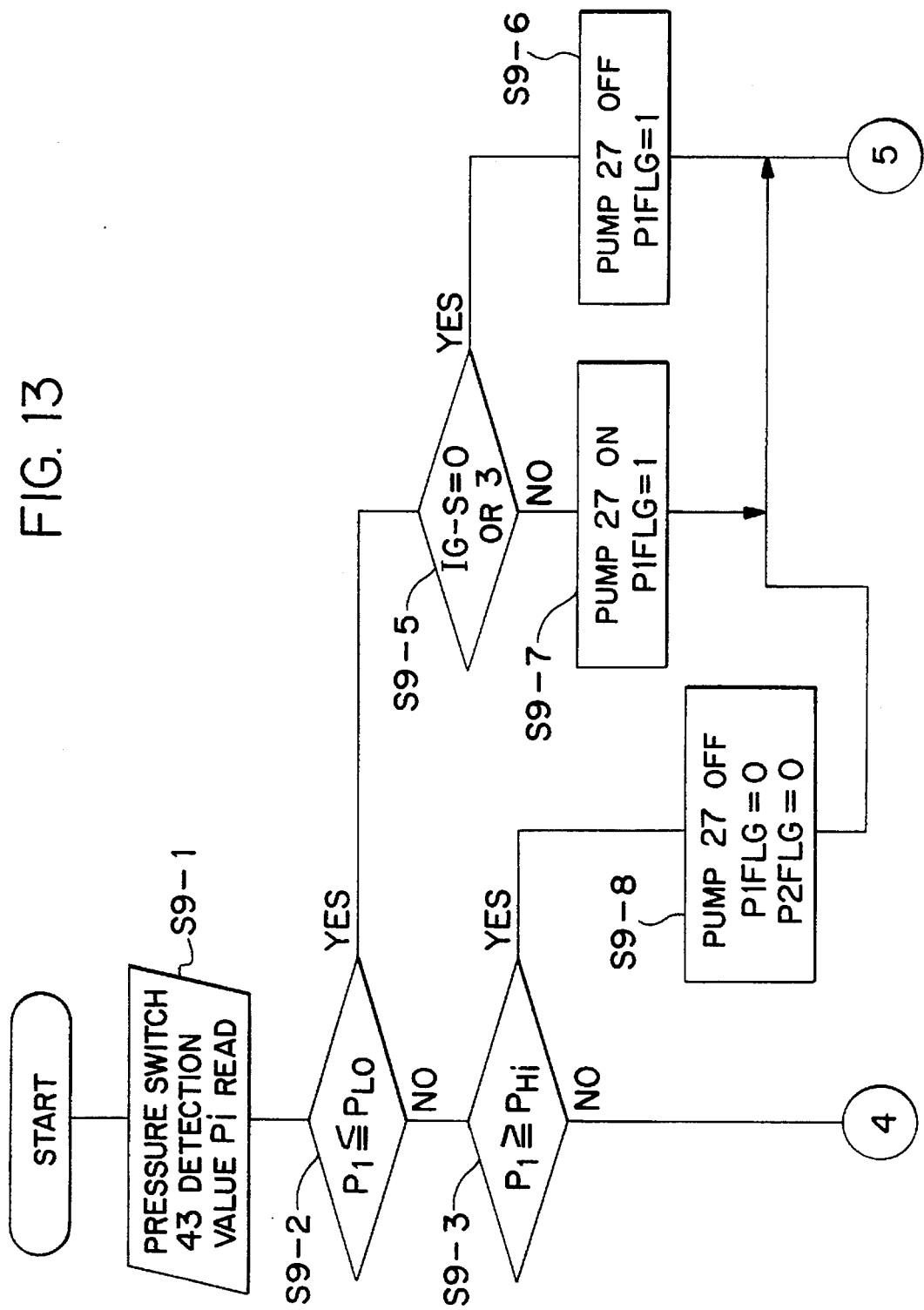
FIG. 13 is a control flow chart (9) of an embodiment of the caster angle control apparatus of the present invention.

As shown in FIG. 13, a detection value $P_1$ of the pressure switch 43 is read in step S8-1, and a determination is made in step S8-2 as to whether or not the detection value $P_1$ is not more than a lower limit value $P_{LO}$. When it is determined in step S9-2 that the detection value $P_1$ is more than the lower limit value $P_{LO}$, a determination is made in step S9-3 as to whether or not the detection value $P_1$ is not less than an upper limit value $P_{HI}$. When it is determined that the detection value $P_1$ is less than the upper limit value $P_{HI}$, that is, the detection value $P_1$ lies between the lower limit value $P_{LO}$ and the upper limit value $P_{HI}$, the processing proceeds to step S9-4 shown in FIG. 14.

When it is determined in step S9-2 that the detection value $P_1$ is not more than the lower limit value $P_{LO}$, a determination is made in step S9-5 as to whether or not IG-S =0 or IG-S=3. When IG-S is determined to be 0 or 3, the pump 27 is turned OFF and a pressure flag P1FLG is set to 0 in step S9-6, and the processing returns to the main flow chart. When IG-S is determined in S9-5 to be other than 0 or 3, the pump 27 is turned ON and the pressure flag P1FLG is set to 1 in step S9-7, and the processing returns to the main flow chart. On the other hand, when it is determined in step S9-3 that the detection value $P_1$ is not less than the upper limit value $P_{HI}$, the pump 27 is turned OFF and a pressure flag P2FLG is set to 0 in step S9-8. The processing then returns to the main flow chart.

Here, the pressure flags P1FLG and P2FLG will be described. Pressure flag P1FLG=0 is for the case where the detection value $P_1$ is once not less than the upper limit value $P_{HI}$ and is not less than the lower limit value $P_{LO}$. Pressure flag P1FLG=1 is for the case where the detection value $P_1$ is not more than the lower limit value $_{LO}$ and is not less than the upper limit value $P_{HI}$. Pressure flag P2FLG=0 is for the case where under the condition of pressure flag P1FLG=0, the actuator 7 follows within the preset value DSO. Pressure flag P2FLG=1 is for the case where under the condition of P1FLG=0, the actuator 7 follows over the preset value DSO.

As shown in FIG. 14, a determination is made in step S9-4 as to whether or not pressure flag P1FLG=0. When pressure flag P1FLG=0 is not determined (P1FLG=1), the processing returns to the main flow chart. When pressure flag P1FLG=0 is determined in step S9-4, in step S9-9 the differences DSL and DSR between the actual strokes SSL and SSR of the actuator 7 and the instruction stoke values DL and SR (DSL=SL–SSL, DSR=SR–SSR). A determination is made in step S9-10 as to whether or not the absolute values |DSL| and |DSR| of the differences DSL and DSR are not less than the preset value DSO. That is, under the condition to stop the pump 27, a determination is made as to whether or not the difference between the actual stroke (operation stroke) of the actuator 7 and the instruction stroke exceeds a preset value.

When it is determined in step S9-10 that the absolute values |DSL| and |DSR| of the differences DSL and DSR are not less than the preset value DSO, a pump timer PTIM is set to 200 in step S9-11, the pressure flag P2FLG is set to 1 in step S9-12, the pump 27 is turned ON in step S9-13, and the processing returns to the main flow chart. That is, even though the pressure $P_1$ is within the preset pressure range and the pump 27 is in the stop condition, when the operation of the actuator 7 does not follow, the pump 27 is driven.

When it is determined in step S9-10 that the absolute values |DSL| and |DSR| of the differences DSL and DSR are within the preset value DSO, a determination is made in step S9-14 as to whether or not pressure flag P2FLG=1. When pressure flag P2FLG=1 is determined, that is, when it is determined that the operation of the actuator 7 follows, the pump timer PTIM is subtracted in step S9-15, and a determination is made in step S9-16 as to whether or not the pump timer PTIM=0. When it is determined in step S9-16 that the pump timer PTIM is not 0, that is, a predetermined time (pump timer PTIM=200) has not elapsed after the pump 27 is turned ON to cause the operation of the actuator 7 to follow and the pump timer PTIM is set to 200 in steps S9-11, S9-12, and S9-13, the processing returns to the main flow chart. When pump timer PTIM=0 is determined in step S9-16, that is, when it is determined that the pump 27 is turned ON and the predetermined time has elapsed, the pressure flag P2FLG is set to 0 in step S9-17, the pump 27 is turned OFF in step S9-18, and the processing returns to the main flow chart. That is, a certain allowance is provided when the pump 27 is turned OFF to decrease ON/OFF frequency of the pump 27, thereby preventing the occurrence of hunting.

Conditions of the pressure $P_1$, ON/OFF of IG, the caster angle, and ON/OFF of the pump 27 when the pump control routine is executed will be described with reference to FIG. 18.

When IG is turned ON (FIG. 18(b)) and the pump 27 is turned ON (FIG. 18(d)), the pressure $P_1$ begins to increase (FIG. 18(a)) to increase the caster angle (FIG. 18(c)). When the pressure $P_1$ increases and exceeds the upper limit value $P_{HI}$ (point X in FIG. 18(a)), the pump 27 is in the OFF condition (step S9-8), and the pressure $P_1$ is maintained between the upper limit value $P_{HI}$ and the lower limit value $P_{LO}$. When the caster angle instruction value (indicated by the dot-bar line in FIG. 18(c)) begins to vary (point Aa in FIG. 18(c)) and the actuator 7 follows, the pressure $P_1$ begins to decrease (point A in FIG. 18(c)). At this moment, a difference occurs between the caster angle instruction value and the actual caster angle (corresponds to the operation stroke of the actuator 7), this difference corresponding to DSL and DSR. The difference is determined to be not less than the preset value DSO at point A in FIG. 18(c), and the pump 27 is turned ON (point A in FIG. 18(d); step S9-13). Then, the stroke difference is within the preset value DSO at point B in FIG. 18(c) and, when the pump timer PTIM is 0, the pump 27 is turned OFF (from point B in FIG. 18(d) to PTIM200; steps S9-15 and S9-18).

When ON/OFF of the pump 27 is controlled according only to the value of the pressure switch 43, as indicated by the dotted line in FIGS. 18(a) and (d), the pump 27 is turned ON at point C where the pressure $P_1$ is less than the lower limit value $P_{LO}$, the actuator 7 sufficiently follows, and the pump 27 is turned OFF at point D where the pressure $P_1$ exceeds the upper limit value $P_{HI}$. Therefore, as indicated by the dotted line in FIG. 18(c), a follow delay occurs, it is difficult to always maintain the pressure $P_1$ between the upper limit value $P_{HI}$ and the lower limit value $P_{LO}$, and the driving time of the pump 27 is increased.

Therefore, in the pump control routine, since the pump 27 is driven irrespective of the pressure $P_1$ condition when the difference between the actual stroke and the instruction stroke value of the actuator 7 exceeds the preset value, the flow rate of hydraulic oil can be efficiently ensured as necessary to improve the response of the actuator 7, and the stop time of the pump 27 can be increased.

With the above alignment control apparatus, conditions of the steering wheel angle θh, the caster angle θ, and the yaw rate when the vehicle changes lanes on a slow road will be described with reference to FIG. 19. In this case, the vehicle speed Vel is assumed as 60 km/h, the lane changing width as 3.5 m, and the lane changing distance as 25 m. FIG. 19(a) shows the condition of steering wheel angle θh, FIG. 19(b) shows the condition of the caster angle θ, and FIG. 19(c) shows the condition of the yaw rate. In the Figures, the solid line indicates a case where the control by the alignment control apparatus of the present invention is executed, and the dotted line indicates a case where the control only with the vehicle speed Vel is executed.

By increasing the caster angle θ according to the steering wheel angle θh, the steering wheel angular velocity θhs, and the road surface μ, the righting moment of the wheels is increased to increase the equivalent cornering power. Therefore, as shown in FIG. 19(a), the steering correction amount is small and steering is stabilized and, as shown in FIG. 19(c), the yaw rate damping time increases and convergence of the vehicle is improved. Therefore, the steering wheel angular velocity θhs increases when changing lanes on a snow road but, by increasing the caster angle, convergence of the vehicle is improved, and steering is stabilised, thereby achieving safe running of the vehicle.

Since, in the above alignment control apparatus, the operation amount of the actuator 7 is controlled according to the steering wheel angle θh, the steering wheel angular velocity θhs, and the road surface μ, in addition to the vehicle speed Ve1, to change the caster angle, the caster angle can be increased to increase the righting moment of the wheels during steering. Therefore, in non-steering or initial steering condition, by an increase in the caster angle according to the vehicle speed, stability of the vehicle is improved in normal condition. Further, in steering condition, the caster angle is increased according to the steering condition to improve stability of the vehicle in a transitional condition.

Further, since, in the above alignment control apparatus, the control gain kkg for controlling the operation of the actuator 7 is gradually varied when the control mode (normal, sports) is changed over, abrupt operation of the actuator 7 can be prevented and shocks due to changing the control mode can be eliminated.

Since, in the above alignment control apparatus, during turning of the vehicle, operation amount of the actuator 7 of the outer wheel of turning is increased to increase the caster angle, the righting force of the outer wheel of turning, which is applied with a larger lateral force during turning, is even further increased. This thereby enhances stability of the vehicle.

With the above alignment control apparatus, even under a condition where the pressure $P_1$ is below the lower limit value $P_{LO}$ and the pump 27 is to be stopped, since the pump 27 is driven when the difference between the actual stroke and the instruction stroke value of the actuator 7 exceeds the preset value, flow rate of hydraulic oil can be assured as necessary even though the flow rate of the pump 27 is small to improve the response of the actuator 7, and the stop time of the pump 27 can be increased. Therefore, durability of the pump 27 can be improved and the pump 27 and the accumulator 33 can be constructed compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A caster angle control apparatus for a suspension of a vehicle comprising:

an actuator mounted to the suspension for varying a caster angle of vehicle wheels;

operation energy supply means for supplying an operation energy of said actuator;

actuator drive means disposed between said actuator and said operation energy supply means for setting a supply amount of the operation energy;

vehicle speed detection means, operatively connected to the control means, for detecting a vehicle speed;

control means, operatively connected to the vehicle speed detection means, for calculating a target caster angle, increased relative to an increase in the vehicle speed detected by said vehicle speed detection means, and for outputting a signal to said actuator drive means to control the operation of said actuator in accordance with the calculated target caster-angle;

steering angular velocity detection means, operatively connected to the control means, for detecting a steering angular velocity; and road surface frictional coefficient detection means, operatively connected to the control means, for detecting a frictional coefficient of the road surface, said control means calculating a steering angular velocity correction amount according to a predetermined coefficient, predetermined based upon the detected vehicle speed, the road surface frictional coefficient detected by said road surface frictional coefficient detection means and the steering angular velocity detected by said steering angular velocity detection means, the control means calculating and subsequently adjusting the calculated target caster angle, according to the calculated steering angular velocity correction amount.

2. The caster angle control apparatus of claim 1, wherein the predetermined coefficient is a steering angular velocity coefficient and the steering angular velocity correction amount is calculated by multiplying the steering angular velocity coefficient, determined according to the detected vehicle speed and the detected road surface frictional coefficient, by the detected steering angular velocity.

3. The caster angle control apparatus of claim 2, wherein the steering angular velocity coefficient is increased as the vehicle speed increases in a region less than a first preset vehicle speed, and is decreased as the vehicle speed increases in a region greater than the first preset vehicle speed.

4. The caster angle control apparatus of claim 3, wherein the steering angular velocity is set to a fixed value in a region between the first preset vehicle speed and a second preset vehicle speed, the second preset vehicle speed being greater than the first preset vehicle speed.

5. The caster angle control apparatus of claim 3, wherein the steering angular velocity coefficient is set to zero in a region less than a third preset vehicle speed, the third preset vehicle speed being smaller than the first preset vehicle speed.

6. The caster angle control apparatus of claim 3, wherein the steering angular velocity coefficient is set to zero in a region greater than a fourth preset vehicle speed, the fourth preset vehicle speed being greater than the second preset vehicle speed.

7. The caster angle control apparatus of claim 2, wherein the steering angular velocity coefficient is increased as the road surface frictional coefficient decreases.

8. The caster angle control apparatus of claim 2, wherein the steering angular velocity coefficient is set to zero in a region where an absolute value of the detected steering angular velocity is less than a lower threshold value.

9. The caster angle control apparatus of claim 2, wherein the steering angular velocity is set to an upper threshold value in a region where the value of the detected steering angular velocity is greater than the upper threshold value.

10. The caster angle control apparatus of claim 1, wherein the target caster angle is calculated according to a predetermined first increasing rate upon the detected vehicle speed being in a speed region smaller than a preset vehicle speed, and the target caster angle is calculated according to a predetermined second increasing rate, the predetermined second increasing rate being smaller than the first increasing rate, upon the detected vehicle speed being in a speed region greater than the preset vehicle speed.

11. The caster angle control apparatus of claim 10, wherein the target caster angle is calculated to be a predetermined smallest value upon the detected vehicle speed being in a speed region less than a lower threshold value.

12. The caster angle control apparatus of claim 10, wherein the target caster angle is calculated to be a predetermined greatest value upon the detected vehicle speed being in a speed region greater than an upper threshold value.

13. The caster angle control apparatus of claim 1, further comprising steering angle detection means for detecting a steering angle, wherein said control means determines a turning direction according to the sign of the steering angle detected by said steering angle detection means, calculates a steering angle correction amount according to the value of the detected steering angle, and corrects a target caster angle of an outer side wheel of turning to be relatively greater than a target caster angle of the inner side wheel of turning.

14. A caster angle control apparatus for a suspension of a vehicle comprising:

an actuator mounted to the suspension for varying a caster angle of vehicle wheels;

operation energy supply means for supplying an operation energy of said actuator;

actuator drive means disposed between said actuator and said operation energy supply means for setting a supply amount of the operation energy;

vehicle speed detection means, operatively connected to the control means, for detecting a vehicle speed;

control means, operatively connected to the vehicle speed detection means, having a plurality of control modes with predetermined control gains differing from each other, one of said plurality of control modes being selected automatically or manually, for setting a target caster angle so that the target caster angle is increased relative to an increase in the vehicle speed detected by said vehicle speed detection means, and outputting a signal to control the operation of said actuator according to said calculated target caster angle;

steering angular velocity detection means, operatively connected to said control means, for detecting a steering angular velocity; and road surface frictional coefficient detection means, operatively connected to said control means, for detecting a frictional coefficient of the road surface, wherein, said control means calculates a steering angular velocity correction amount according to a predetermined coefficient, predetermined based upon the detected vehicle speed, the road surface frictional coefficient detected by said road surface frictional coefficient detection means and the steering angular velocity detected by said steering angular velocity detection means, said control means calculating and subsequently adjusting the calculated target caster angle, according to the calculated steering angular velocity correction amount, and said control means gradually varies the control gain when the control gain is changed.

15. A method for controlling a caster angle of a suspension comprising the steps of:

(a) detecting a speed of the vehicle;

(b) detecting a steering angular velocity of the vehicle;

(c) detecting a frictional coefficient of a road surface upon which the vehicle is traveling;

(d) calculating a target caster angle, increased relative to an increase in the detected vehicle speed of step (a);

(e) generating a steering angular velocity correction amount based upon the detected speed of step (a), steering angular velocity of step (b) and frictional coefficient of step (c);

(f) adjusting the calculated target caster angle according to the generated steering angular velocity correction amount; and (g) controlling a caster angle of wheels of the vehicle through an actuator mounted to the suspension in accordance with the target caster angle adjusted in step (f).

16. The method of claim 15, wherein step (e) includes the substeps of:

(i) determining a steering angular velocity coefficient based upon the detected vehicle speed of step (a) and the detected frictional coefficient of step (c); and (ii) multiplying the determined steering angular velocity coefficient by the steering angular velocity of step (b) to generate the steering angular velocity correction amount.

17. The method of claim 16, wherein step (e) (i) includes the substeps of:

(ia) setting the steering angular velocity coefficient to increase relative to an increase in the detected vehicle speed of step (a) when the detected vehicle speed of step (a) is less than a first preset speed; and (ib) setting the steering angular velocity coefficient to decrease relative to an increase in the detected vehicle speed of step (a) when the detected vehicle speed of step (a) is greater than the first preset speed.

18. The method of claim 16, wherein step (e)(i) includes the substeps of:

(ia) setting the steering angular velocity coefficient to a fixed value when the detected vehicle speed of step (a) is between a first preset speed and a second preset speed greater than the first preset speed;

(ib) setting the steering angular velocity coefficient to zero when the detected vehicle speed of step (a) is less than a third preset speed, the third preset speed being less than the first preset speed; and (ic) setting the steering angular velocity coefficient to zero when the detected vehicle speed of step (b) is greater than a fourth preset speed, the fourth preset speed being greater than the second preset speed.

19. The method of claim 15, wherein step (d) includes the substeps of:

(i) calculating the target caster angle according to a first predetermined increasing rate when the detected vehicle speed of step (a) is less than a first preset value; and '(ii) calculating the target caster angle according to a second predetermined increasing rate, less than the first predetermined increasing rate, when the detected vehicle speed of step (a) is greater than the first preset value.

20. The caster angle control apparatus of claim 14, wherein, when the control mode is changed from one control mode to another different control mode, said control means repeatedly add or subtract a preset value to or from the control gain of the one control mode at each of a plurality of preset time intervals, so as to coincide with the control gain of the another different control mode, to gradually vary the control gain.

* * * * *